US012629833B2

(12) United States Patent
Gomez Gutierrez et al.

(10) Patent No.: US 12,629,833 B2
(45) Date of Patent: May 19, 2026

(54) TRAJECTORY PLANNING SYSTEMS AND METHODS

(71) Applicant: Intel Corporation, Santa Clara, CA (US)

(72) Inventors: David Gomez Gutierrez, Tlaquepaque (MX); Leobardo Campos Macias, Guadalajara (MX); Christopher Cruz Ancona, Coyoacan (MX); Rafael De La Guardia Gonzalez, Teuchitlan (MX); Javier Felip Leon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 18/146,079

(22) Filed: Dec. 23, 2022

(65) Prior Publication Data

US 2024/0217103 A1     Jul. 4, 2024

(51) Int. Cl.
B25J 9/00         (2006.01)
B25J 9/16         (2006.01)

(52) U.S. Cl.
CPC ... B25J 9/1666 (2013.01); *G05B 2219/39001* (2013.01); *G05B 2219/40629* (2013.01)

(58) Field of Classification Search
CPC .................. B25J 9/1666; B25J 9/1664; G05B 2219/39001; G05B 2219/40629
See application file for complete search history.

(56) References Cited

U.S. PATENT DOCUMENTS

| | | | | |
|---|---|---|---|---|
| 6,278,907 | B1 * | 8/2001 | Fromherz | B65H 43/00 |
| | | | | 700/262 |
| 6,359,621 | B1 * | 3/2002 | Maeda | G06T 7/20 |
| | | | | 345/473 |
| 9,895,803 | B1 * | 2/2018 | Oslund | B25J 9/1666 |
| 2017/0364076 | A1 * | 12/2017 | Keshmiri | G05B 19/41 |
| 2021/0316509 | A1 * | 10/2021 | Malhan | B29C 64/379 |
| 2022/0331954 | A1 * | 10/2022 | Yamazaki | B25J 9/163 |
| 2023/0294277 | A1 * | 9/2023 | Yang | G05B 19/4155 |
| | | | | 700/217 |

OTHER PUBLICATIONS

S. Terry et al., "The influence of smart manufacturing towards energy conservation: A review," Technologies, vol. 8, No. 2, p. 31, 2020.

(Continued)

*Primary Examiner* — Khoi H Tran
*Assistant Examiner* — Tien Minh Le
(74) *Attorney, Agent, or Firm* — Banner & Witcoff, Ltd.

(57)         ABSTRACT

Techniques are disclosed for a trajectory planning of robots, such as collaborative robots (cobots). A controller of a robot may include a path planner, a trajectory generator, and a trajectory controller. The path planner may determine a plurality of waypoints defining a path between an initial pose of the robot and a goal pose of the robot. The trajectory generator may determine a trajectory between the initial pose and the goal pose based on the waypoints and one or more trajectory criterion. The trajectory controller may generate a control signal to control the robot based on the determined trajectory.

25 Claims, 10 Drawing Sheets

(56)      References Cited

OTHER PUBLICATIONS

K. Li, Y. Lan, P. Jiang, H. Cao, and J. Zhou, "An efficient computation for energy optimization of robot trajectory," IEEE Transactions on Industrial Electronics, 2021.

T. Tsuji, P. G. Morasso, and M. Kaneko, "Trajectory generation for manipulators based on artificial potential field approach with adjustable temporal behavior," in IEEE international conference on intelligent robots and systems, 1996, vol. 2, pp. 438-443.

H. M. Becerra, C. R. Vazquez, G. Arechavaleta, and J. Delfin, "Predefined-Time convergence control for High-Order integrator systems using time base generators," IEEE Transactions on Control Systems Technology, vol. 26, No. 5, pp. 1866-1873, 2018.

N. Ratliff, M. Zucker, J. A. Bagnell, and S. Srinivasa, "CHOMP: Gradient optimization techniques for efficient motion planning," in 2009 IEEE international conference on robotics and automation, 2009, pp. 489-494.

R. W. Brockett, "Finite dimensional linear systems," 1987.

W. J. Rugh, "Linear system theory," 1996.

S. Karaman and E. Frazzoli, "Sampling-based algorithms for optimal motion planning," The International Journal of Robotics Research, vol. 30, No. 7, pp. 846-894, 2011, doi: 10.1177/0278364911406761 <https://protect-us.mimecast.com/s/ PcfgC73D6MuE95ZGfBu1rE>.

C. Chamzas et al., "MotionBenchMaker: A tool to generate and benchmark motion planning datasets," IEEE Robotics and Automation Letters, vol. 7, No. 2, pp. 882-889, 2021.

T. Flash and N. Hogan, "The coordination of arm movements: An experimentally confirmed mathematical model," Journal of neuroscience, vol. 5, No. 7, pp. 1688-1703, 1985.

O. I. Zhelezov, "N-dimensional rotation matrix generation algorithm," American Journal of Computational and Applied Mathematics, vol. 7, No. 2, pp. 51-57, 2017.

* cited by examiner

300

Processing Circuitry 302

Sensor(s) 304

Transceiver 306

Memory 310

Path planning 312

Trajectory generation 314

Algorithm 2: Motion Primitives from Demonstrations input :: Start state $(X_0, V_0)$, Final state $(X_f, V_f)$, Final time $t_f$ output :: Set of $n+1$ waypoints $((t_0, X_0, V_0), \ldots, (t_f, X_f, V_f))$, with $((t_0, X_0, V_0) = (0, 0, V_0)$; $(t_f, X_n, V_n) = (t_f, 1, V_f))$ constraints: $\mathrm{Abs}\big[y^k_d(t) - y^k(t; q^A_{i-1}, q^A_i, q^A_{i+1}, q^A_{i+2})\big] < d^k_{max}$ $$\dot{x}^k(0) \, \forall i \quad q^k_{max}; \, q^k(0) \quad q^k_{max} \quad i = 1, \ldots, n \tag{1}$$

$$\text{for} \quad t_{i-1} < t < t_{i+1} \, \forall i \, \forall i$$

$$0 \le t \le t_f, \, k \in D$$

$t_0 \leftarrow 0$ waypoints $\leftarrow \big((t_0, Y_d(t_0), \dot{Y}_d(t_0))\big)$ while $t_0 < t_f$ do

$t_1 \leftarrow t_f$ while *Not* $Y\big((t; Y_d(t_0), \dot{Y}_d(t_0), Y_d(t_1), \dot{Y}_d(t_1))\big)$ *satisfies constraints*

*(1)* do

$\lfloor$ Decrement $(t_1)$ waypoints $\leftarrow$ waypoints $\cup \big((t_1, Y_d(t_1), \dot{Y}_d(t_1))\big)$ $t_0 \leftarrow t_1$

*Algorithm 2: Motion Primitives from Demonstrations*

FIG. 9

Algorithm 1: Traversing a Geometric Path input : $x_0$, $W$ output: $x(\cdot)$ $t_0 := t$ $t_f := getMinimumTime(x_0, W(0))$ $x_{c,f} := getRest(W.front())$ $W.pop()$ while *true* do $x_c(t) := getState(t_0, t_f, x_0, x_{c,f}, t)$ $x(t).append(x_c(t))$ if $\|x_c(t).p - W.front()\|.\ \leq \gamma$ then if $\#(W) < 1$ then break;

if $\#(W) > 1$ then $t_0 := t$ $t_f := getMinimumTime(x_c(t), W.front())$ $x_0 := x_c(t)$ $x_{c,f} := getRest(W.front())$ $W.pop()$ $t := t + \delta t$

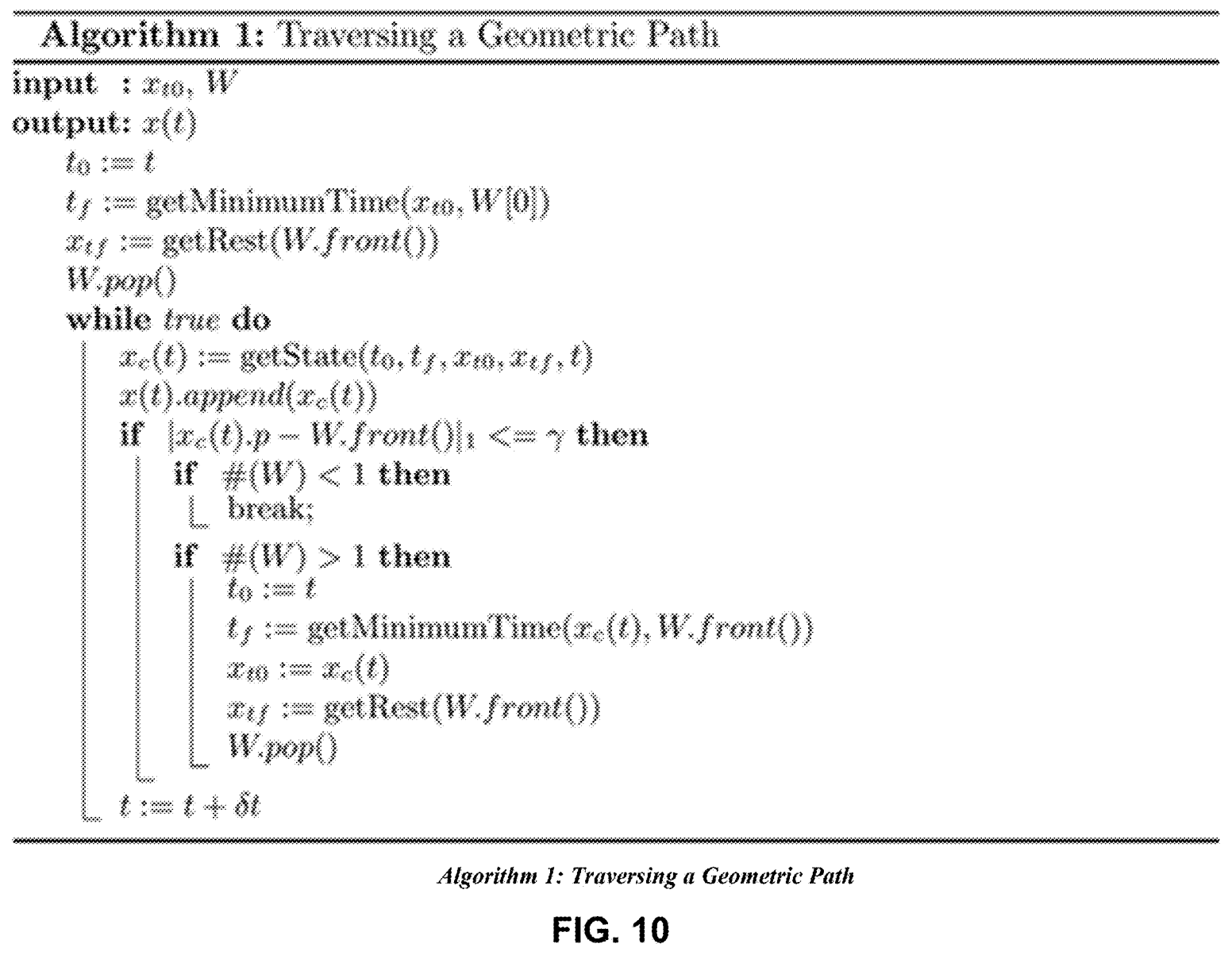

*Algorithm 1: Traversing a Geometric Path*

FIG. 10

TRAJECTORY PLANNING SYSTEMS AND METHODS

TECHNICAL FIELD

The disclosure generally relates to motion and trajectory planning for autonomous systems, including autonomous agents such as collaborative robots.

BACKGROUND

Trajectory planning provides for collision-free paths for stationary and/or mobile autonomous agents. Mobile autonomous agents may include autonomous mobile robots (AMRs). Stationary autonomous agents may include autonomous robots, such as collaborative robots (Cobots). While typical industrial robots may work independently and fully take over a given task, Cobots are collaborative robots which are configured to work with people, not in place of them. Cobots can be used to create a hybrid work environment with human operators.

In human-robot collaboration settings, the human operators and the environment change quickly and frequently, which requires continuous, on-the-fly computing of robot plans. Conventional systems require long compute times (e.g. 60 second to compute for a 9-second trajectory rendering), which makes such systems impractical for Cobot implementations.

BRIEF DESCRIPTION OF THE DRAWINGS/FIGURES

The accompanying drawings, which are incorporated herein and form a part of the specification, illustrate the present disclosure and, together with the description, and further serve to explain the principles of the disclosure and to enable a person skilled in the pertinent art to make and use the techniques discussed herein.

FIG. 9 illustrates a flow diagram of an exemplary algorithm for determining motion primitives from demonstrations in accordance with the disclosure.

FIG. 10 illustrates a flow diagram of an exemplary algorithm for traversing a geometric path in accordance with the disclosure.

The present disclosure will be described with reference to the accompanying drawings. The drawing in which an element first appears is typically indicated by the leftmost digit(s) in the corresponding reference number.

DETAILED DESCRIPTION

Figure 1:
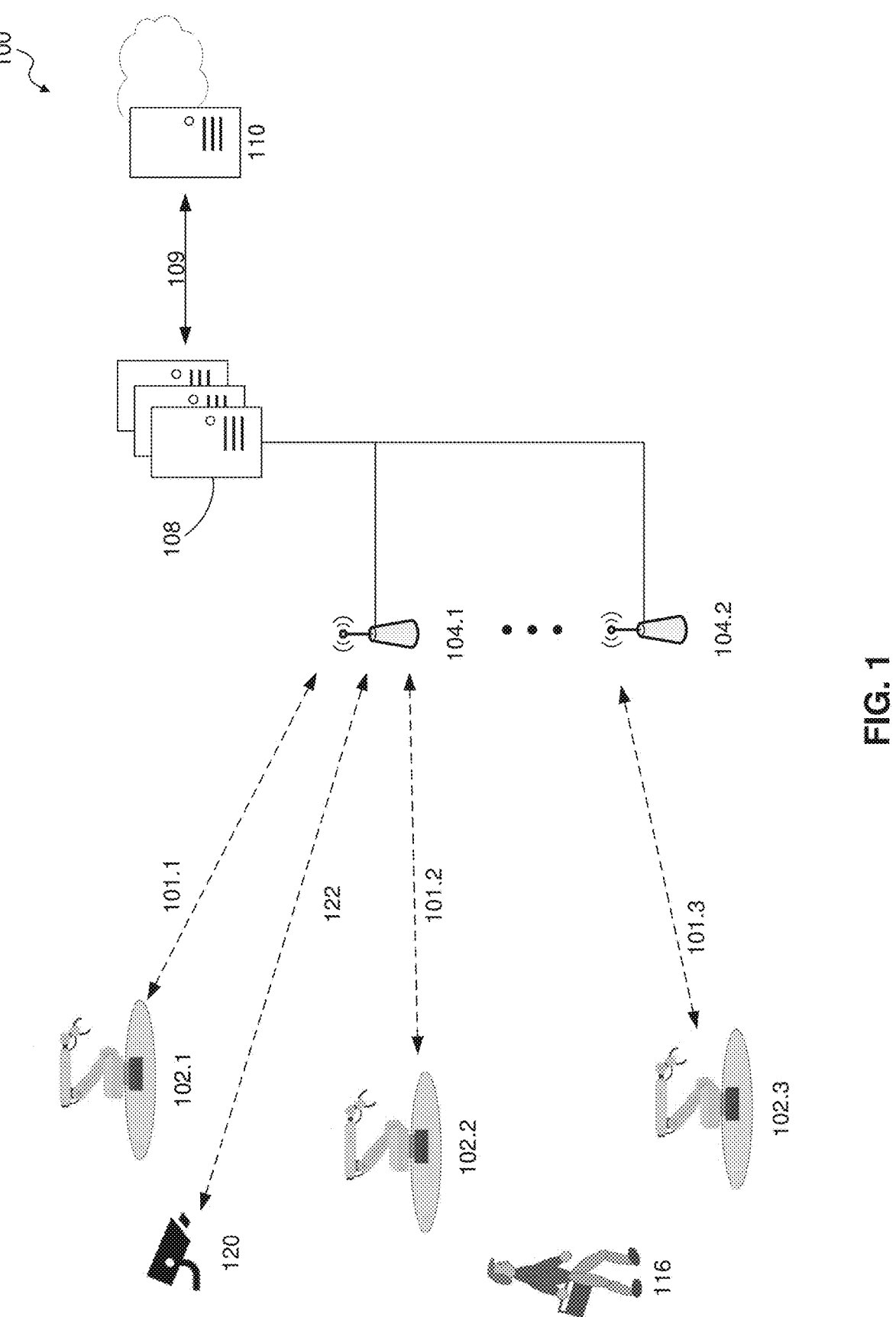
FIG. 1 illustrates a block diagram of an exemplary environment utilizing autonomous agents (e.g. cobots), in accordance with the disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

The present disclosure provides an advantageous solution to improve trajectory planning methods that provide fast optimal trajectory planning methods applicable in general human-robot collaboration environments.

Motion planning on cluttered and uncontrolled environments is used for successful robot manipulation in industrial and human-shared environments. With a pair of robot configurations, waypoint connections are determined to find a trajectory that connects them while satisfying dynamic constraints (e.g. velocity/acceleration/jerk). The motion generation impacts how fast tasks are executed; the energy consumption on performing a task; and the quality of the trajectory. The human collaborator can be used to determine the trajectory, including that the intent of the robot can be inferred from the observed trajectory.

The present disclosure includes a trajectory generation method that includes a computationally lightweight method to traverse a set of configurations (with a desired, velocity, acceleration, jerk, etc.), a process to determine the generator parameters such that the resulting trajectory are the ones that minimizes a desired performance criteria, and/or a process to determine the minimum time, such that dynamic constraints are satisfied. Advantageously, the present disclosure provides a complete motion planning framework for cluttered environments, and a method to learn motion primitives from demonstrations.

Autonomous agents, such as cobots, are increasing being adapted for use in factories, warehouses, hospitals, and other industrial and/or commercial environments. Autonomous mobile platforms implement perception and manipulation jointly to accomplish a given task. Cobots may communicate with a central controller and/or with one or more other autonomous agents.

According to the disclosure, the system is configured to implement a trajectory algorithm that generates trajectories for cobots or other autonomous agents. Although the exemplary embodiments are described with respect to stationary autonomous agents, such as cobots, the disclosure is applicable to other autonomous agents, such as mobile agents (e.g. AMRs). The disclosure is also applicable for determining trajectories in larger environments, such as in autonomous vehicle implementations. The method provides that collision-free trajectories, considering the obstacles detected by one or more environmental sensors, the cobot's sensor(s), and/or sensor(s) of one or more other the neighboring cobot's. The systems and methods are advantageously fast and scalable and usable in dynamic environments.

FIG. 1 illustrates an exemplary environment 100. The environment 100 may utilize cobots 102 (and/or other autonomous agents) in accordance with the disclosure. The environment 100 supports any suitable number of autonomous agents, with three cobots 102.1-102.3 being shown for ease of explanation. The environment 100 may include one or more sensors 120 configured to monitor the locations and activities of the cobots 102, humans 116, machines, other robots, or other objects (as would be understood by one of ordinary skill in the art) within the environment 100. The sensors 120 may include, for example, radar, LIDAR, optical sensors, infrared sensors, cameras, or other sensors as would be understood by one or ordinary skill in the art. The sensors may communicate information (sensor data) with the computing device 108 (via access point(s) 104). Although not shown in FIG. 1 for purposes of brevity, the sensor(s) 120 may additionally communicate with one another and/or with one or more of the cobots 102.

The cobots 102 may be a stationary robot having moveable components, such as one or moveable manipulator arms having an end-effector to complete localized tasks. The environment 100 supports any suitable number of cobots 102, with three cobots 102.1-102.3 being shown for ease of explanation. The environment 100 may be any suitable type of environment that may use autonomous agents (e.g. cobots 102), such as a factory, warehouse, hospital, office building, etc. The environment 100 may be a partial or fully autonomous environment. Although a centralized environment is illustrated in FIG. 1, the environment may be partially or fully decentralized. The autonomous agents 102 may have any suitable type of design and function to communicate with other components of a network infrastructure as further disused below. The autonomous agents 102 may operate autonomously or semi-autonomously, and be configured as cobots that are configured to operate within the environment 100 to complete specific tasks. One or more of the cobots 102 may alternatively be configured as a movable agent, such as an AMR or other movable robot.

Figure 2:
FIG. 2 illustrates a block diagram of an exemplary autonomous agent in accordance with the disclosure.
Figure 2:
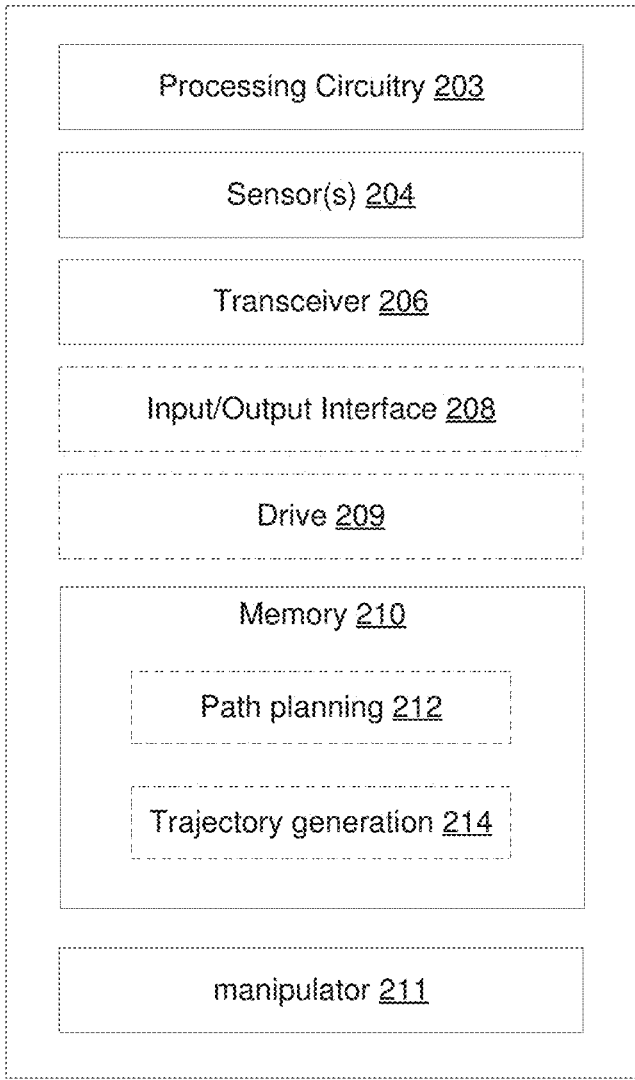

The cobots 102 may include any suitable number and/or type of sensors to determine characteristics of the cobots 102 and/or components(s) thereof, and/or enable sensing of their surroundings and the identification of feedback regarding the environment 100. As illustrated in FIG. 2, the cobots 102 may implement a suite of onboard sensors 204 to generate sensor data indicative of the location, position, velocity, heading orientation, etc. of the cobot 102 and/or one or more components (e.g. manipulator arm, arm joint(s), arm segment(s), and/or end effector) of the cobot 102. These sensors 204 may be implemented as any suitable number and/or type that are generally known and/or used for pose determinations (location, angle, position, etc.), autonomous navigation, and/or environmental monitoring. The sensor data may indicate the location, position, velocity, heading orientation of the cobot 102 and/or one or more components (e.g. manipulator arm and/or arm segment(s), end effector) of the cobot 102, presence of and/or range to various objects near the cobot 102 and/or component(s) thereof. The cobot 102 may process this sensor data to identify characteristics (e.g. location, position, velocity, etc.) of the cobot 102 and/or component(s) thereof, characteristics of objects in the proximity of the cobot 102, obstacles or other relevant information within the environment 100, and/or other information as would be understood by one of ordinary skill in the art.

The cobots 102 may further be configured with any suitable number and/or type of wireless radio components (e.g. transceiver 206) to facilitate the transmission and/or reception of data. For example, the cobots 102 may transmit data indicative of current tasks being executed and/or characteristics (e.g. location, orientation, velocity, trajectory, heading, etc. of the cobot 102 and/or component(s) thereof). As another example, the cobots 102 may receive commands and/or information from the computing device 108. Although not shown in FIG. 1 for purposes of brevity, the cobots 102 may additionally or alternatively communicate with one another to determine information with respect to the other cobots 102, as well as other information such as sensor data generated by other cobots 102.

The cobots 102 may operate within the environment 100 by communicating with the various components of the supporting network infrastructure. The network infrastructure may include any suitable number and/or type of components to support communications with the cobots 102. For example, the network infrastructure may include any suitable combination of wired and/or wireless networking components that operate in accordance with any suitable number and/or type of communication protocols. For instance, the network infrastructure may include interconnections using wired links such as Ethernet or optical links, as well as wireless links such as Wi-Fi (e.g. 802.11 protocols) and cellular links (e.g. 3GPP standard protocols, LTE, 5G, etc.). The network infrastructure may be, for example, an access network, an edge network, a mobile edge computing (MEC) network, etc. In the example shown in FIG. 1, the network infrastructure includes one or more cloud servers 110 that enable a connection to the Internet, which may be implemented as any suitable number and/or type of cloud computing devices. The network infrastructure may additionally include a computing device 108, which may be implemented as any suitable number and/or type of computing device such as a server. The computing device 108 may be implemented as an Edge server and/or Edge computing device, but is not limited thereto. The computing device 108 and/or server 110 may also be referred to as a controller.

According to the disclosure, the computing device 108 may communicate with the one or more cloud servers 110 via one or more links 109, which may represent an aggregation of any suitable number and/or type of wired and/or wireless links as well as other network infrastructure components that are not shown in FIG. 1 for purposes of brevity. For instance, the link 109 may represent additional cellular network towers (e.g. one or more base stations, eNodeBs, relays, macrocells, femtocells, etc.). According to the disclosure, the network infrastructure may further include one or more access points (APs) 104. The APs 104 which may be implemented in accordance with any suitable number and/or type of AP configured to facilitate communications in accordance with any suitable type of communication protocols. The APs 104 may be configured to support communications in accordance with any suitable number and/or type of communication protocols, such as an Institute of Electrical and Electronics Engineers (IEEE) 802.11 Working Group Standards. Alternatively, the APs 104 may operate in accordance with other types of communication standards other than the 802.11 Working Group, such as cellular based standards (e.g. "private cellular networks) or other local wireless network systems, for instance. Additionally, or alternatively, the cobots 102 may communicate directly with the computing device 108 or other suitable components of the network infrastructure without the need to use the APs 104. Additionally, or alternatively, one or more of cobots 102 may communicate directly with one or more other cobots 102.

In the environment 100 as shown in FIG. 1, the computing device 108 is configured to communicate with one or more of the cobots 102 to receive data from the cobots 102 and to transmit data to the cobots 102. This functionality may be additionally or alternatively be performed by other network infrastructure components that are capable of communicating directly or indirectly with the cobots 102, such as the one or more cloud servers 110, for instance. However, the local nature of the computing device 108 may provide additional advantages in that the communication between the computing device 108 and the cobots 102 may occur with reduced network latency. Thus, according to the disclosure, the computing device 108 is used as the primary example when describing this functionality, although it is understood that this is by way of example and not limitation. The one or more cloud servers 110 may function as a redundant system for the computing device 108.

The computing device 108 may thus receive sensor data from each for the cobots 102 via the APs 104 (and/or using other wired and/or wireless technologies) and use the respective sensor data, together with other information about the environment 100 that is already known (e.g. data regarding the size and location of static objects in the environment 100, last known locations of dynamic objects, etc.), to generate an environment model that represents the environment 100. This environment model may be represented as a navigation grid having cells of any suitable size and/or shape, with each cell having specific properties with respect to the type of object contained (or not contained) in the cell, whether an object in the cell is static or moving, etc., which enables the environment model to accurately depict the nature of the environment 101. The environment model may thus be dynamically updated by the cobots 102 directly and/or via the computing device 108 on a cell-by-cell basis as new sensor data is received from the cobots 102 to generate a policy for the cobots 102. The updates to the shared environment model thus reflect any recent changes in the environment 100 such as the position and orientation of each of the cobots 102 and other obstacles that may change in a dynamic manner within the environment 100 (e.g. people, machinery, etc.). The shared environment model may additionally or alternatively be updated based upon data received from other sensors 120 or devices within the environment 100, such as stationary cameras for example, which may enable a more accurate depiction of the positions of the cobots 102 without relying on cobot communications.

Each cobot 102 may execute a planning algorithm (and/or use the environment model at a particular time) to calculate path plans and trajectories for the cobot 102 and/or components thereof. These path plans and trajectories may include sets of intermediate points ("waypoints") or nodes that define a cobot trajectory between a starting point (starting pose) to a destination (goal pose) within the environment 100 and/or within a local environment of the particular cobot 102. That is, the waypoints indicate to the cobots 102 how to execute a respective planned navigational path to proceed to each of the intermediate points at a specific time until a destination is reached. The path planning algorithm of one or more of the cobots 102 may be updated by the cobot 102 (e.g. processing circuitry 203) and/or computing device 108 e.g. processing circuitry 302). According to the disclosure, the computing device 108, server 110, and/or cobot(s) 102 may implement machine-learning to adapt one or more algorithms and/or models configured to control the operation of the cobots 102 within the environment 100.

The computing device 108 may alternatively or additionally (potentially in collaboration with one or more of the cobots 102 calculate navigational paths and/or trajectories for one or more of the cobots 102. Alternatively, or additionally, the cloud server(s) 110 may be configured to calculate navigational paths and/or trajectories for one or more of the cobots 102, which may then be transmitted to the cobots 102. It should be appreciated that any combination of the cobots 102, computing device 108, and cloud server(s) 110 may calculate the navigational paths and/or trajectories. The cobots 102, computing device 108, and/or cloud server(s) 110 may include processing circuitry that is configured to perform the respective functions of the cobots 102, computing device 108, and/or cloud server(s) 110, respectively. One or more of these devices may further be implemented with machine-learning capabilities.

Information dynamically discovered by the cobots 102 may be, for instance, a result of each cobot 102 locally processing its respective sensor data. The sensor data may be used by the cobots 102 to determine which waypoint to add to a particular trajectory so that the assigned task(s) of the cobots 102 may be accomplished in the most efficient manner. The updated shared environment model may be maintained by computing device 108 (e.g. configured as a central controller) and shared with each of the cobots 102. The environment model may be stored in the computing device 108 and/or locally in a memory associated with or otherwise accessed by each one of the cobots 102. Additionally, or alternatively, the shared environment model may be stored in any other suitable components of the network infrastructure or devices connected thereto. In any event, the cobots 102 may iteratively receive or otherwise access the shared environment model, including the most recent updates, to perform navigation path planning functions as discussed herein. The shared environment model may thus be updated as new sensor data is received by the central controller (computing device 108) and processed, and/or processed locally by the cobots 102, and be performed in a periodic manner or in accordance with any suitable schedule. The environment model represented as a navigation grid having cells of any suitable size and/or shape, with each cell having specific properties with respect to the type of object contained (or not contained) in the cell, whether an object in the cell is static or moving, etc., which enables the environment model to accurately depict the nature of the environment 100. Additionally, or alternatively, individual cobots 102 may manage a respective individualized environment model for the local environment of the respective cobot 102.

Turning to FIG. 2, the cobots 102 may implement a suite of onboard sensors 204 to generate sensor data indicative of the location, position, velocity, heading orientation, etc. of the cobot 102 and/or one or more components (e.g. manipulator arm and/or arm segment(s), end effector) of the cobot 102. These sensors 204 may be implemented as any suitable number and/or type that are generally known and/or used for autonomous navigation and environmental monitoring. Examples of such sensors may include radar, LIDAR, optical sensors, cameras, compasses, gyroscopes, positioning systems for localization, position sensors, angle sensors, accelerometers, etc. Thus, the sensor data may indicate the location, position, velocity, heading orientation of the cobot 102 and/or one or more components (e.g. manipulator arm and/or arm segment(s), joints, end-effector) of the cobot 102, presence of and/or range to various objects near the cobot 102 and/or component(s) thereof. The cobot 102 may process this sensor data to identify characteristics (e.g. location, position, velocity, etc.) of the cobot 102 and/or component(s) thereof, characteristics of objects in the proximity of the cobot 102, obstacles or other relevant information within the environment 100, and/or other information as would be understood by one of ordinary skill in the art.

The cobot 102 may use onboard sensors 204 to identify e.g. a position, orientation, velocity, direction, and/or location of its components to navigate its end effector to accomplish desired tasks. Additionally, or alternatively, the cobot 102 may use onboard sensors 204 and/or environmental sensor(s) 120 to determine a demonstrated movement (e.g. movement of the end-effector by a human operator, the movement of the human operation, and/or other demonstrated movement). The processing circuitry 202 can execute path planning and trajectory generating algorithms stored in memory 210 to execute the movements of the cobot 102, including the movement of components of the cobot(s) 102. The path planning and/or trajectory generation may be iteratively performed. The cobots 102 may also any suitable number and/or type of hardware and software configurations to facilitate navigational functions of its components. For example, each cobot 102 may implement a controller that may comprise one or more processors or processing circuitry 202, which may execute software that is installed on a local memory 210 to perform various path planning, trajectory calculations, and/or navigational-related functions (e.g. pose estimation, SLAM, octomap generation, etc.).

The cobots 102 may further be configured with any suitable number and/or type of wireless radio components to facilitate the transmission and/or reception of data. For example, the cobots 102 may transmit data to the computing device 108 and/or to other cobot(s).

Although the disclosure includes examples of the environment 100 being a factory or warehouse that supports cobots 102 operating within such an environment, this is by way of example and not a limitation. The teachings of the disclosure may be implemented in accordance with any suitable type of environment and/or type of autonomous agent. For instance, the environment 100 may be outdoors and be identified with a region such as a roadway that is utilized by autonomous vehicles. Thus, the teachings of the disclosure are applicable to cobots as well as other types of autonomous agents that may operate in any suitable type of environment based upon any suitable application or desired function.

The cobots 102 operate within the environment 100 by independent path planning and trajectory generation and/or coordinating/cooperative path planning and trajectory generation by communicating with one or more other cobots 102 and/or controller 108. The cobots 102 may include any suitable combination of wireless communication components that operate in accordance with any suitable number and/or type of wireless communication protocols. For instance, the network infrastructure may include optical links and/or wireless links such as Wi-Fi (e.g. Institute of Electrical and Electronics Engineers (IEEE) 802.11 Working Group Standards) and cellular links (e.g. 3GPP standard protocols, LTE, 5G, etc.). Communications between cobots 102 may be directed to one or more individual cobots 102 and/or broadcast to multiple cobots 102. Communications may be relayed by or more network components (e.g. access points) and/or via one or more other intermediate cobots 102.

The cobots 102 may be configured to process sensor data from one or more of its sensors and/or other information about the environment 100 that is already known, such as map data, which may include data regarding the size and location of static objects in the environment 100, last known locations of dynamic objects, etc. The processed data may be used to determine one or more trajectories.

According to the disclosure, the cobot(s) 102 may implement machine-learning to adapt one or more algorithms and/or models configured to control the operation of the cobot 102 within the environment 100. The cobots 102 may include processing circuitry that is configured to perform the respective functions of the cobot 102.

Information dynamically discovered by the cobots 102 may be, for instance, a result of each cobot 102 locally processing its respective sensor data. Because of the dynamic nature of the environment 100, each cobot 102 may calculate its own respective path plans and/or trajectories in a continuous and iterative manner based on its sensor data, senor or other data from one or more other cobots 102, map or other data as would be understood by one of ordinary skill in the arts.

Computing Device (Controller) Design and Configuration

Figure 3:
FIG. 3 illustrates a block diagram of an exemplary computing device (controller) in accordance with the disclosure.
Figure 3:
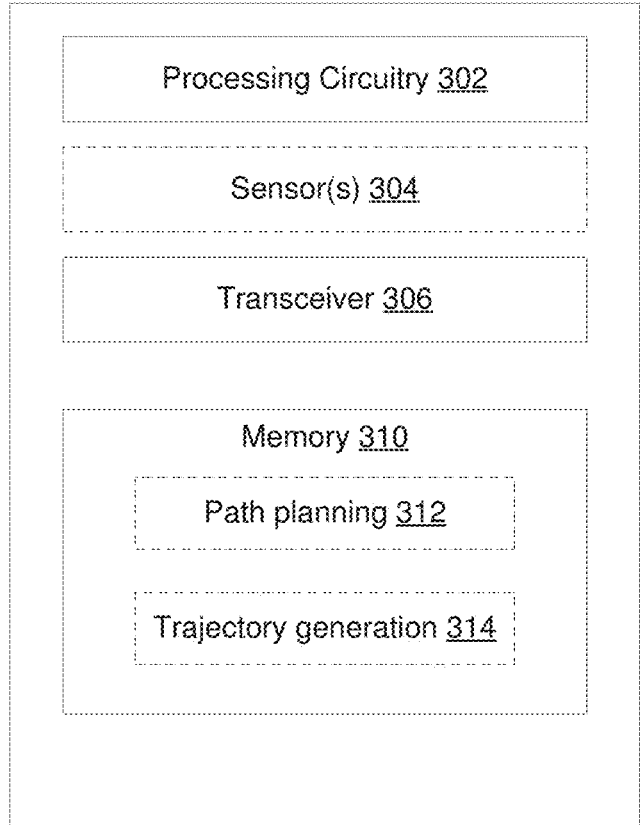

FIG. 3 illustrates a block diagram of an exemplary computing device 300, in accordance with the disclosure. The computing device (controller) 300 as shown and described with respect to FIG. 3 may be identified with the computing device 108 and/or server 110 as shown in FIG. 1 and discussed herein, for instance. The computing device 300 may be implemented as an Edge server and/or Edge computing device, such as when identified with the computing device 108 implemented as an Edge computing device and/or as a cloud-based computing device when identified with the server 110 implemented as a cloud server.

The computing device 300 may include processing circuitry 302, one or more sensors 304, a transceiver 306, and a memory 310. In some examples, the computer device 300 is configured to interact with one or more external sensors (e.g. sensor 120) as an alternative or in addition to including internal sensors 304. The components shown in FIG. 3 are provided for ease of explanation, and the computing device 300 may implement additional, less, or alternative components as those shown in FIG. 3.

The processing circuitry 302 may be configured as any suitable number and/or type of computer processors, which may function to control the computing device 300 and/or other components of the computing device 300. The processing circuitry 302 may be identified with one or more processors (or suitable portions thereof) implemented by the computing device 300.

The processing circuitry 302 may be configured to carry out instructions to perform arithmetical, logical, and/or input/output (I/O) operations, and/or to control the operation of one or more components of computing device 300 to perform various functions as described herein. For example, the processing circuitry 302 may include one or more microprocessor cores, memory registers, buffers, clocks, etc., and may generate electronic control signals associated with the components of the computing device 300 to control and/or modify the operation of these components. For example, the processing circuitry 302 may control functions associated with the sensors 304, the transceiver 306, and/or the memory 310.

According to the disclosure, the processing circuitry 302 may be configured to: perform path planning and/or trajectory generation (possibly in collaboration with the cobot(s) 102) for one or more cobots 102; control (possibly in collaboration with the cobot(s) 102) the operation of the cobot(s) 102 within the environment 101, such as controlling movement of the cobot(s) 102 and/or its components within the environment 101; control the cobot(s) 102 to gather additional data or information about the environment 101; and/or one or more other functions as would be understood by one of ordinary skill in the art.

The sensors 304 may be implemented as any suitable number and/or type of sensors that may be used for navigation and/or environmental monitoring. Examples of such sensors may include radar, LIDAR, optical sensors, cameras, compasses, gyroscopes, positioning systems for localization, accelerometers, etc. In some examples, the computing device 300 is additionally or alternatively configured to communicate with one or more external sensors similar to sensors 304 (e.g. sensor 120 in FIG. 1).

The transceiver 306 may be implemented as any suitable number and/or type of components configured to transmit and/or receive data packets and/or wireless signals in accordance with any suitable number and/or type of communication protocols. The transceiver 306 may include any suitable type of components to facilitate this functionality, including components associated with known transceiver, transmitter, and/or receiver operation, configurations, and implementations. Although depicted in FIG. 3 as a transceiver, the transceiver 306 may include any suitable number of transmitters, receivers, or combinations of these that may be integrated into a single transceiver or as multiple transceivers or transceiver modules. For example, the transceiver 306 may include components typically identified with an RF front end and include, for example, antennas, ports, power amplifiers (PAS), RF filters, mixers, local oscillators (LOs), low noise amplifiers (LNAs), upconverters, downconverters, channel tuners, etc. The transceiver 306 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

The memory 310 stores data and/or instructions such that, when the instructions are executed by the processing circuitry 302, cause the computing device 300 to perform various functions as described herein. The memory 310 may be implemented as any well-known volatile and/or non-volatile memory. The memory 310 may be implemented as a non-transitory computer readable medium storing one or more executable instructions such as, for example, logic, algorithms, code, etc. The instructions, logic, code, etc., stored in the memory 310 are may be represented by various modules which may enable the features described herein to be functionally realized. For example, the memory 310 may include one or more modules representing an algorithm, such a path planning module 312 configured to perform the path planning operations and/or a trajectory generation module 314 configured to perform trajectory generation or related calculations. For hardware implementations, the modules associated with the memory 310 may include instructions and/or code to facilitate control and/or monitor the operation of such hardware components. Thus, the disclosure includes the processing circuitry 302 executing the instructions stored in the memory in conjunction with one or more hardware components to perform the various functions described herein.

Agent (Cobot) Design and Configuration

Turning back to FIG. 2, a block diagram of an exemplary autonomous agent 200 in accordance with the disclosure is illustrated. The autonomous agent 200 as shown and described with respect to FIG. 2 may be identified with one or more of the cobots 102 as shown in FIG. 1 and discussed herein. The autonomous agent 200 may include processing circuitry 202, one or more sensors 204, transceiver 206, memory 210, and manipulator 211. The manipulator 211 may include an end-effector, which may be situated at the distal end of the single- or multi-segmented manipulator arm. The autonomous agent 200 may additionally include input/output (I/O) interface 208, and/or drive 209 (e.g. when the agent 200 is a mobile agent). The components shown in FIG. 2 are provided for ease of explanation, and the autonomous agent 200 may implement additional, less, or alternative components as those shown in FIG. 2.

The processing circuitry 202 may be configured as any suitable number and/or type of computer processors, which may function to control the autonomous agent 200 and/or other components of the autonomous agent 200. The processing circuitry 202 may be identified with one or more processors (or suitable portions thereof) implemented by the autonomous agent 200. The processing circuitry 202 may be configured to carry out instructions to perform arithmetical, logical, and/or input/output (I/O) operations, and/or to control the operation of one or more components of autonomous agent 200 to perform various functions associated with the disclosure as described herein. For example, the processing circuitry 202 may include one or more microprocessor cores, memory registers, buffers, clocks, etc., and may generate electronic control signals associated with the components of the autonomous agent 200 to control and/or modify the operation of these components. For example, the processing circuitry 202 may control functions associated with the sensors 204, the transceiver 206, interface 208, drive 209, memory 210, and/or manipulator 211. The processing circuitry 202 may additionally perform various operations to control the movement, speed, and/or tasks executed by the autonomous agent 200, which may be based upon path planning and/or trajectory algorithms executed by the processing circuitry 202.

The sensors 204 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, angle sensors, etc.

The transceiver 206 may be implemented as any suitable number and/or type of components configured to transmit and/or receive data packets and/or wireless signals in accordance with any suitable number and/or type of communication protocols. The transceiver 206 may include any suitable type of components to facilitate this functionality, including components associated with known transceiver, transmitter, and/or receiver operation, configurations, and implementations. Although depicted in FIG. 2 as a transceiver, the transceiver 206 may include any suitable number of transmitters, receivers, or combinations of these that may be integrated into a single transceiver or as multiple transceivers or transceiver modules. For example, the transceiver 206 may include components typically identified with an RF front end and include, for example, antennas, ports, power amplifiers (PAS), RF filters, mixers, local oscillators (LOs), low noise amplifiers (LNAs), upconverters, downconverters, channel tuners, etc. The transceiver 206 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

I/O interface 208 may be implemented as any suitable number and/or type of components configured to communicate with the human(s) 115. The I/O interface 208 may include microphone(s), speaker(s), display(s), image projector(s), light(s), laser(s), and/or other interfaces as would be understood by one of ordinary skill in the arts.

The drive 209 may be implemented as any suitable number and/or type of components configured to drive the autonomous agent 200, such as a motor or other driving mechanism. The processing circuitry 202 may be configured to control the drive 209 to move the autonomous agent 200 in a desired direction and at a desired velocity.

The memory 210 stores data and/or instructions such that, when the instructions are executed by the processing circuitry 202, cause the autonomous agent 200 to perform various functions as described herein. The memory 210 may be implemented as any well-known volatile and/or non-volatile memory. The memory 210 may be implemented as a non-transitory computer readable medium storing one or more executable instructions such as, for example, logic, algorithms, code, etc. The instructions, logic, code, etc., stored in the memory 210 may enable the features disclosed herein to be functionally realized. The instructions, logic, code, etc., stored in the memory 210 are may be represented by various modules which may enable the features described herein to be functionally realized. For example, the memory 210 may include one or more modules representing an algorithm, such a path planning module 212 configured to perform path planning operations and/or a trajectory generation module 214 configured to perform trajectory generation or related calculations. For hardware implementations, the modules associated with the memory 210 may include instructions and/or code to facilitate control and/or monitor the operation of such hardware components.

The manipulator 211 may be implemented as any suitable number and/or type of components configured to interact with and/or manipulate the environment and/or object(s) within the environment, such as a manipulator arm (e.g. with an end-effector) and/or other mechanism to interact with one or more objects.

Motion Planning Algorithm and Structure

Figure 4:
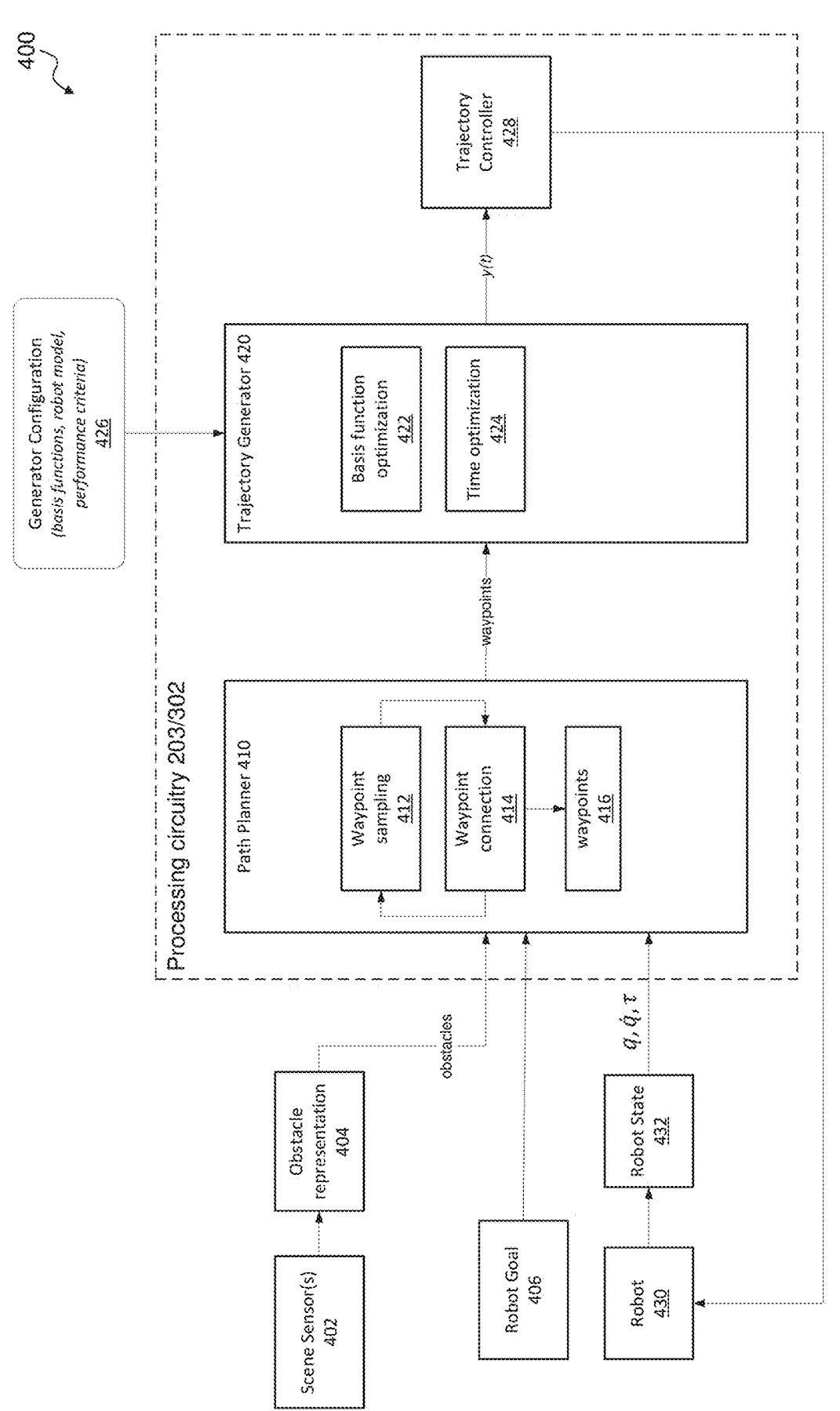
FIG. 4 illustrates an operational flowchart of planning method in accordance with the disclosure.

FIG. 4 illustrates a flowchart of an exemplary motion planning process 400 in accordance with the disclosure. The process 400 shown may be performed by each cobot 102, the computing device 108, or any combination thereof. The process may be iteratively performed until the goal is met or each identified sub-goal is completed. Two or more of the various operations illustrated in FIG. 4 may be performed simultaneously in some configurations. Further, the order of the various operations is not limiting and the operations may be performed in a different order in some configurations. Discussion of the operations may additionally, or alternatively include reference to the structural component(s) performing the operation(s). For example, in discussing the path planning operation 410, reference may be made to the "path planner 410" embodied by the processing circuitry 203 and/or path planning module 212 in memory 210.

The motion planning algorithm 400 according to the disclosure advantageously provides an increased success rate in complex scenarios, including that time to compute a trajectory is reduce by several magnitudes. This allows for a faster reaction in collision avoidance for a Human-Robot collaboration activity, trajectories are executed faster allowing a higher throughput, and that the generated trajectory have increased energy efficiency. Although the motion planning algorithm is described for autonomous agents in the form of cobots 102, the disclosure is not limited thereto and the trajectory planning algorithm may be applied to other agents or vehicles as would be understood by one of ordinary skill in the art.

The motion planning process 400 includes path planning, trajectory generation, and controlling the trajectory of the cobot 102 (at operation 430). The path planning, trajectory generation, and controlling of the trajectory of the cobot 102 may be performed by the cobot 102, the computing device 108, or by both the cobot 102 and the computing device 108 in a collaborative implementation. As illustrated in FIG. 4, the path planning can be implemented by a path planner 410, the trajectory generation can be implemented by trajectory generator 420, and the controlling can be implemented by trajectory controller 428. The path planner 410, trajectory generator 420, and/or trajectory controller 428 may be embodied in processing circuitry 203 (when performed by the cobot 102) and/or processing circuitry 302 (when performed by the computing device 108). Additionally, or alternatively, the path planner 410, trajectory generator 420, and/or trajectory controller 428 may be embodied as modules within memory 210 and/or memory 310. For example, the memory 210 may include path planning module 212 and trajectory generation module 214 that include instructions, logic, and/or code to cause the processing circuitry 203 to perform the path planning and trajectory generation according to the disclosure. The memory 210 may include instructions, logic, and/or code to cause the processing circuitry 203 to control the cobot 102 to perform the generated trajectories. Similarly, the memory 310 may include path planning module 312 and trajectory generation module 314 that include instructions, logic, and/or code to cause the processing circuitry 302 to perform the path planning and trajectory generation according to the disclosure. The memory 310 may include instructions, logic, and/or code to cause the processing circuitry 302 to control the cobot 102 to perform the generated trajectories.

The path planning operation performed by the path planner 410 may be based on one or more detected obstacles (operation 404), one or more goals of the cobot 102 (operation 406), and/or the state of the cobot 102 (operation 432). In this example, the path planner 410 may receive data corresponding to represented obstacle at operation 404. The obstacle may be determined from sensor data received from one or more sensors (e.g. sensor(s) 120, sensor(s) 204, and/or sensor(s) 304) at operation 402. One or more goals of the cobot 102 (e.g. the goal pose of the end-effector of the cobot 102) may be provided to the path planner 410 at operation 406. The state of the cobot 102 may be determined at operation 432 based on data received and/or processed by the cobot 102, such as from one or more sensors (e.g. sensor(s) 204). The state of the cobot 102 may then be provided to the path planner.

Path Planner Design and Configuration

The path planner 410 may include a waypoint sampler 412, a waypoint connector 414, and a waypoint generator 416. In the path planning operation 410 (by the path planner 410), a sequence of points between the starting (initial) pose of the cobot 102 and the goal pose of the cobot 102 are sampled at operation 412 (waypoint sampling 412). A path connecting the starting pose and the goal pose is defined by selecting waypoints (waypoint connection 414) from the sampled points. The waypoints may be determined/selected (e.g. by the waypoint generator 416) based on one or more demonstrated end-effector trajectories of an end-effector of a manipulator arm of the robot. For example, the path planner 410 may be configured to analyze one or more demonstrated movements of the end-effector of the cobot 102 to determine waypoints satisfying the demonstrated trajectory of the end-effector.

According to the disclosure, the path planner 410 may be configured to determine one or more motion primitive between each pair of consecutive waypoints. The motion primitive(s) may be determined based on one or more (trajectory) criterion, such as energy, jerk, time, or the like. The motion primitive(s) may be determined such that the same criterion observed in the demonstration is optimized.

The motion primitive(s) may be a polynomial that connects the respective pair of the consecutive waypoints. According to the disclosure, for waypoint connection operation 414, using the initial and final/goal pose of the cobot 102, a programming-by-demonstration (PBD) algorithm may be configured to produce a sequence of motion primitives that generates the desired motion per joint of the manipulator (e.g. 211) of the cobot 102. Each primitive may include the polynomial connecting a pair of consecutive waypoints, selected to optimize the same criteria observed in the demonstration.

According to the disclosure, waypoints operation 416 (waypoints generator) may provide a smooth transition between primitives, ensuring that constraints (e.g. maximum tracking error, velocity and/or acceleration constraints) are satisfied during the whole trajectory. This is further illustrated in Algorithm 2: Motion Primitives from Demonstrations, as shown in FIG. 9. According to the disclosure, to generalize to different start/final poses, the primitives may be parameterized in a nominal space, where the start/final configurations correspond to the zero vector and one vector, respectively. For example, the necessary D-dimensional rotation matrix can be used to transform the input configurations, in D-dimensional configuration space, into the nominal space.

According to the disclosure, motion primitives may be used to generate trajectories in a programming-by-demonstration (PBD) framework. In PBD, a human operator demonstrates, for the cobot 102, how to perform a desired task. This demonstration may focus on the motion of the end-effector of the cobot 102, but is not limited thereto. To replicate human motor coordination that generally provides the smoothest possible movement, the motion primitives may be determined such that one or more criterion is optimized. For example, the jerk may be minimized. Additionally, or alternatively, economy of movement (e.g. energy minimization) and/or satisfying timing constraints may be used.

The motion primitive(s) determined according to the disclosure are configured to produce trajectories (e.g. produced using the trajectory generator 420) with, for example, minimum jerk, minimum energy, etc., while meeting the specification and/or limitations (e.g. cobot specifications provided in the cobot model information 426) of the cobot 102. The resulting trajectories may also meet prescribed time constraints, or may generate the desired motion in minimum time given cobot constraints (e.g. cobot specifications provided in the cobot model information 426).

As discussed in more detail below, the waypoints defining the path can be used to establish trajectories that may be applied in zero shot, single shot, or multiple shot learning, while also producing efficient, natural looking movements (e.g. manipulator movements) by the cobot 102. In zero shot learning, a start (initial) pose and a final/goal pose are provided. The poses may be provided as 6D poses or as complete joint configurations. For 6D poses, inverse kinematics techniques may be used to compute the corresponding joint configurations. According to the disclosure, the PBD algorithm may be configured to produce, for each joint, the motion primitive that generates the desired motion. The primitive includes the polynomial, parameterized by the start/final states, of the correct order to generate the desired type of motion, such as minimum energy. In one-shot and multiple-shot learning, the demonstrations provide, in addition to the start/final poses, one or more intermediate waypoints that the cobot is required to follow when performing the motion. When multiple demonstrations are given, the demonstrations may be used to extract bounds on the error along the trajectory according to the task.

Connecting Trajectory Generation with Geometrical Path Planning

According to the disclosure, the path planner 410 may be configured to perform geometric planning to provide motion planning for a cobot 102, such as for the manipulator arm of the cobot 102. The geometric planning may input a given set of desired goals $q_f$-configurations, a starting configuration $q_0$. The starting configuration $q_0$ may be obtained by the forecasting (as discussed below). Additionally, or alternatively, the starting configuration $q_0$ may be obtained from the initial configuration of the manipulator arm and a map representation of the dynamic and/or static obstacles. The path planner 410 may be configured to output a sequence of collision-free robot configurations or path(s) to reach one of the assigned goals. The path planner 410 may be configured to perform an Inverse Kinematics algorithm that map a desired cartesian pose of the end-effector to a set of joint configurations to obtain the goal configurations $q_f$.

According to the disclosure, the geometric planning may use a Rapidly-exploring Random Trees (RRT)-Connect implementation, but is not limited thereto. Additionally, or alternatively, one or more other geometric planning methods may be used, such as RRT, probabilistic roadmap (PRM), RRT*, or the like.

In traversing the geometric path in obstacle-free scenarios, the initial joint configuration starting from rest upon a final joint configuration as initial and final states can be used, while looking for the minimum time. In such obstacle-free scenarios, the path planner 410 may be configured to traverse the sequence of robot configurations or waypoints that considers how to travel from the initial joint position $q_0$ towards the desired goal $q_f$, avoiding obstacles and self-collisions. According to the disclosure, the path planner 410 may be configured to perform a geometric path algorithm as provided in Algorithm 1: Traversing a Geometric Path, as shown in FIG. 10.

In this example, the trajectory generator 420 may generate a trajectory that fulfill the dynamical constraints of the manipulator arm (configurations 428) according to a waypoint input provided by the path planner 410. Algorithm 1 allows for an online replanning by forecasting a future configuration of the robot and using it as the initial state for that segment, which is advantageous for avoiding dynamic obstacles. Forecasting is discussed in more detail below.

According to Algorithm 1, with the initial state $x_{r0}$ and the first waypoint W·front( ) of the waypoint list W, the minimum time $t_f$ that fulfills all the constraints is found, considering that the system will arrive at that waypoint at rest. This first waypoint is popped from the list of waypoints. Thus, the model is propagated with the desired discretization step $\delta t$ and appending the trajectory to x(t). Once the distance from the position of the last calculated state $x_c(t)$·p and the desired waypoint is less than a prescribed threshold $\gamma$, review can be performed if the list of waypoints is not empty #(W)>1. If the list is empty, the algorithm returns the computed trajectory. Otherwise, we take the first waypoint W·front( ) and recalculate the minimum time $t_f$ to reach that waypoint at rest. The first waypoint of the list is popped W·pop $\varphi$ and this process is repeated until the waypoint list is empty.

Forecasting and Replanning

Figure 8A:
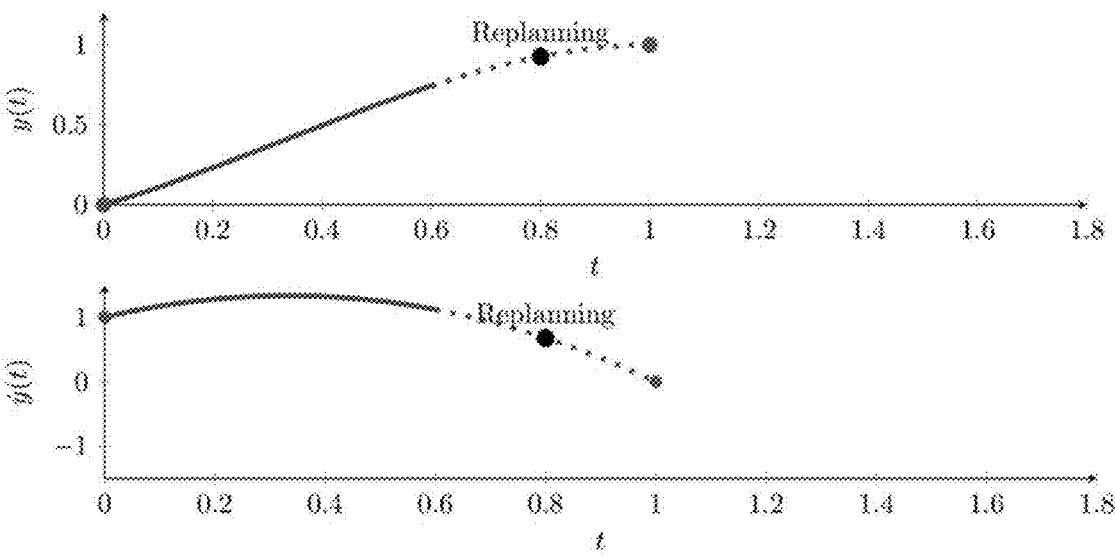
FIG. 8A illustrates an exemplary trajectory forecast operation in accordance with the disclosure.
Figure 8B:
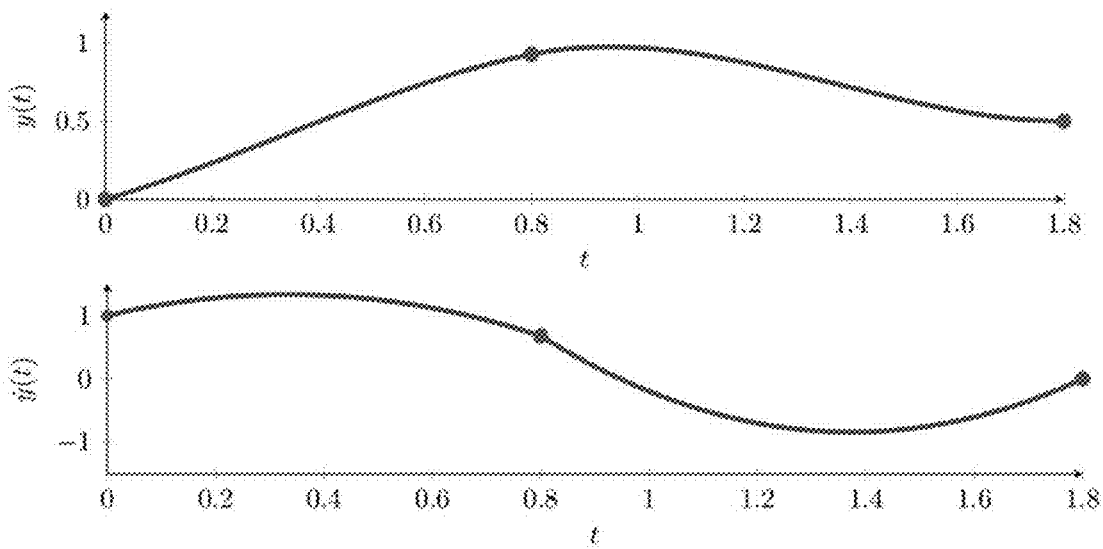
FIG. 8B illustrates an exemplary trajectory after replanning in accordance with the disclosure.

According to the disclosure, the state of the trajectory may be forecast for any time $t \in [t_0, t_0+t_f]$ by evaluating a future time t in Equation (3.1). This is useful for collision checking and also for replanning, as the maximum replanning computation time $\tau_r$ can be considered to forecast the state of the trajectory at a time $t+\tau_r$, to connect such future state with a new trajectory. Thus, maintaining a continuous trajectory that can be executed by the cobot 102. This is illustrated in FIGS. 8A-8B, where an initial trajectory (using the basis in Equation (2)) is generated with initial state $x(0)=[0,1]^T$, final state $x(t_f)=[1,0]^T$, and $t_f=1$. At a time $t=0.6$ a trajectory is replanned considering a replanning computation time of $\tau_r=0.2$. Thus, the state $y(0.8)=[0.9280,0.6800]^T$ is forecasted at $t=0.8$. Such state is used to connect to a new state $x(t_f)=[0.5,0]^T$ with $t_0=0.8$ and $t_f=1$. FIG. 8A illustrates examples of a trajectory for $n=2$ with $x(0)=[0,1]^T$ and $x(t_f)=[1,0]^T$ with $t_f=1$, forecasting the state at $t=0.8$ for re-planning. FIG. 8B illustrates the trajectory after the re-planning.

Trajectory Generator Design and Configuration

According to the disclosure, the trajectory generator 420 may include a basis function optimizer 422 and a time optimizer 424. The basis function optimizer 422 may be configured to optimize one or more basis functions. The time optimizer 424 may be configured to determine a minimum trajectory time, based on the initial and goal poses of the cobot 102, that satisfies one or more constraints of the cobot 102 (e.g. maximum velocity, maximum acceleration, maximum torque, etc.). The determination of the minimum trajectory time may be determined for each joint of the manipulator of the cobot 102.

In the trajectory generation operation (operation 420), the trajectory is determined that connects the initial and final poses of the cobot 102, where the determination of the trajectory can be for each joint of the cobot 102. Each pair of consecutive waypoints in the path representation is connected by using trajectories that minimize one or more criterion, such as an energy cost criterion. That is, the trajectory generator 420 may be configured to determine a trajectory between the initial pose and the goal pose based on the waypoints and one or more generator configurations provided at operation 426. The generator configurations may include one or more generic basis functions to be optimized, robot model specifications (e.g. number of joints, one or more joint constraints, such as velocity and acceleration constraints, or other specifications of the cobot 102, and/or one or more one or more trajectory criterion to be minimized (e.g. energy, movement, jerk). The trajectory between the initial pose and the goal pose may be determined per joint of a manipulator arm of the cobot 102.

The basis function optimizer 422 may be configured to optimize one or more basis functions, and may include a predefined time generator. The predefined time generator may be configured to compute the basis functions of a generated optimal trajectory connecting a given initial and final joint configuration by the end of a fixed time interval. The resulting trajectory minimizes one or more selected cost criterion (e.g. energy, movement, jerk).

As an introduction to the trajectory generation, for a trajectory $y(t)$, $y^{(i)}(t)$ represent the i-th derivative of $y(t)$ with respect to time. The vector $\mathbf{y}(t)$ denotes the vector containing the trajectory $y(t)$ and its high-order derivatives, i.e, $\mathbf{y}(t)=[y(t),\ y^{(1)}(t),\ .\ .\ .\ ,\ y^{(n-1)}(t)]^T$, where the operator $[\ ]^T$ represents the matrix transpose operator. For an n dimensional vector $z$ and a $n\times n$ matrix $M$, the weighted norm is defined as $$\|z\|_M = \sqrt{z^T M z}.$$

Optimal Trajectory Generation Between Two Desired States

According to the disclosure, given a sequence of desired states $$\{x_i\}_{i=0}^{k}$$

and a sequence of desired connection times $$\{t_i\}_{i=0}^{k},$$

an optimal trajectory $y(t)$ satisfies $$y(t_i) = x_i \text{ for all } i = 1, \dots, k,$$

As discussed above, the generation of the trajectory can include the optimization of one or more basis functions and the determination of minimum trajectory time.

Basis Functions

Consider a state $x_k \in R^{n+1}$, $k=0, \dots, n-1$, to generate trajectories in real-time connecting $x_k$ and $x_{k+1}$, the basis function optimizer 422 may include a predefined-time generation algorithm that is based on one or basis functions. The basis function optimization (at operation 422), one or more basis functions are selected to create a trajectory that minimizes a desired objective function. For a desired value of n, two sets of basis functions $$\{w_i\}_{j=0}^{n-1}$$

and $$\{h_i\}_{j=0}^{n-1}$$

may be used, which satisfy the following conditions:

The functions $h_j(t)$ and $w_j(t)$, $j=0, \dots, n-1$, are at least n-times differentiable functions such that $$h_j^{(k)}(0) = \begin{cases} 1 & \text{if } j = k \\ 0 & \text{otherwise} \end{cases}$$

$$h_j^{(k)}(1) = 0 \text{ for all } j = 0, 1\dots, n-1$$

and $$w_j^{(k)}(0) = 0 \text{ for all } j = 0, \dots, n-1$$

$$w_j^{(k)}(1) = \begin{cases} 1 & \text{if } j = k \\ 0 & \text{otherwise} \end{cases}$$

Figure 5:
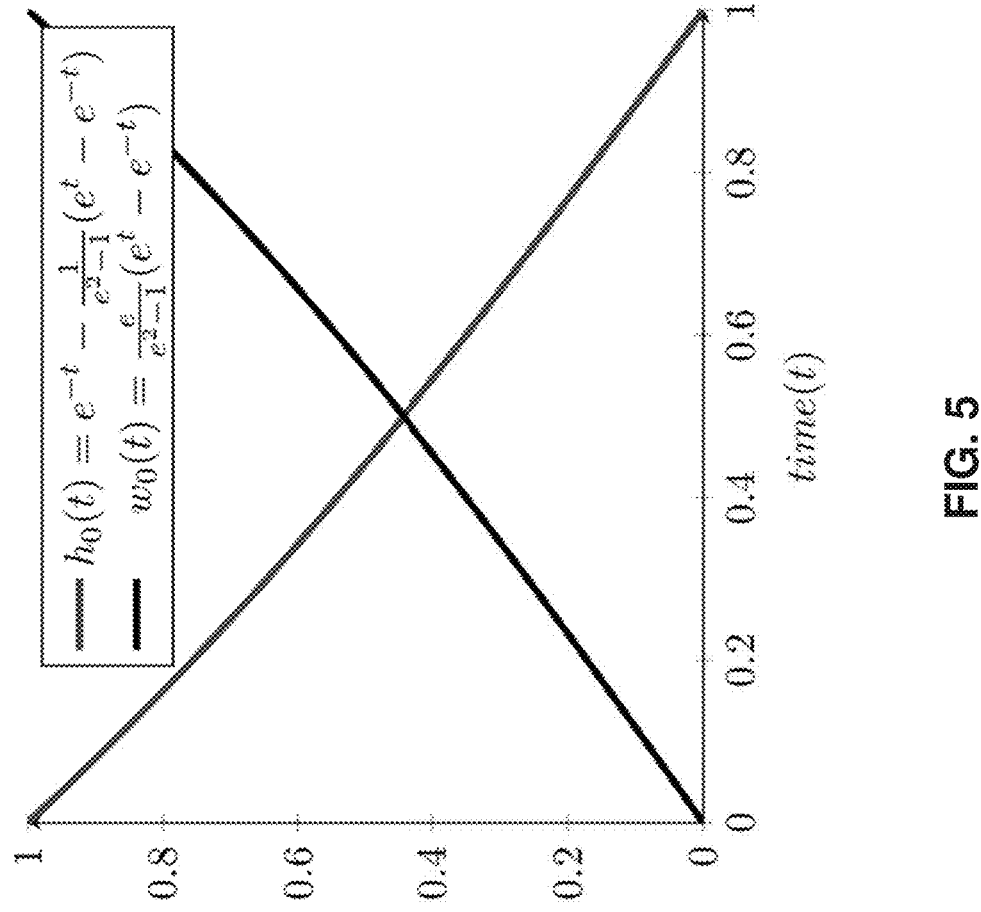
FIG. 5 illustrates an exemplary basis function in accordance with the disclosure.

In FIG. 5, plots of example basis functions $$\{h_j, w_j\}_{j=0}^{n-1} \text{ for } n = 1$$

are illustrated. FIG. 5 shows the plots of basis functions:

$$h_0(t) = e^{-t} - \frac{1}{e^2 - 1}(e^t - e^{-t}) \tag{1}$$

$$w_0(t) = \frac{e}{e^2 - 1}(e^t - e^{-t})$$

Figures 6A, 6B:
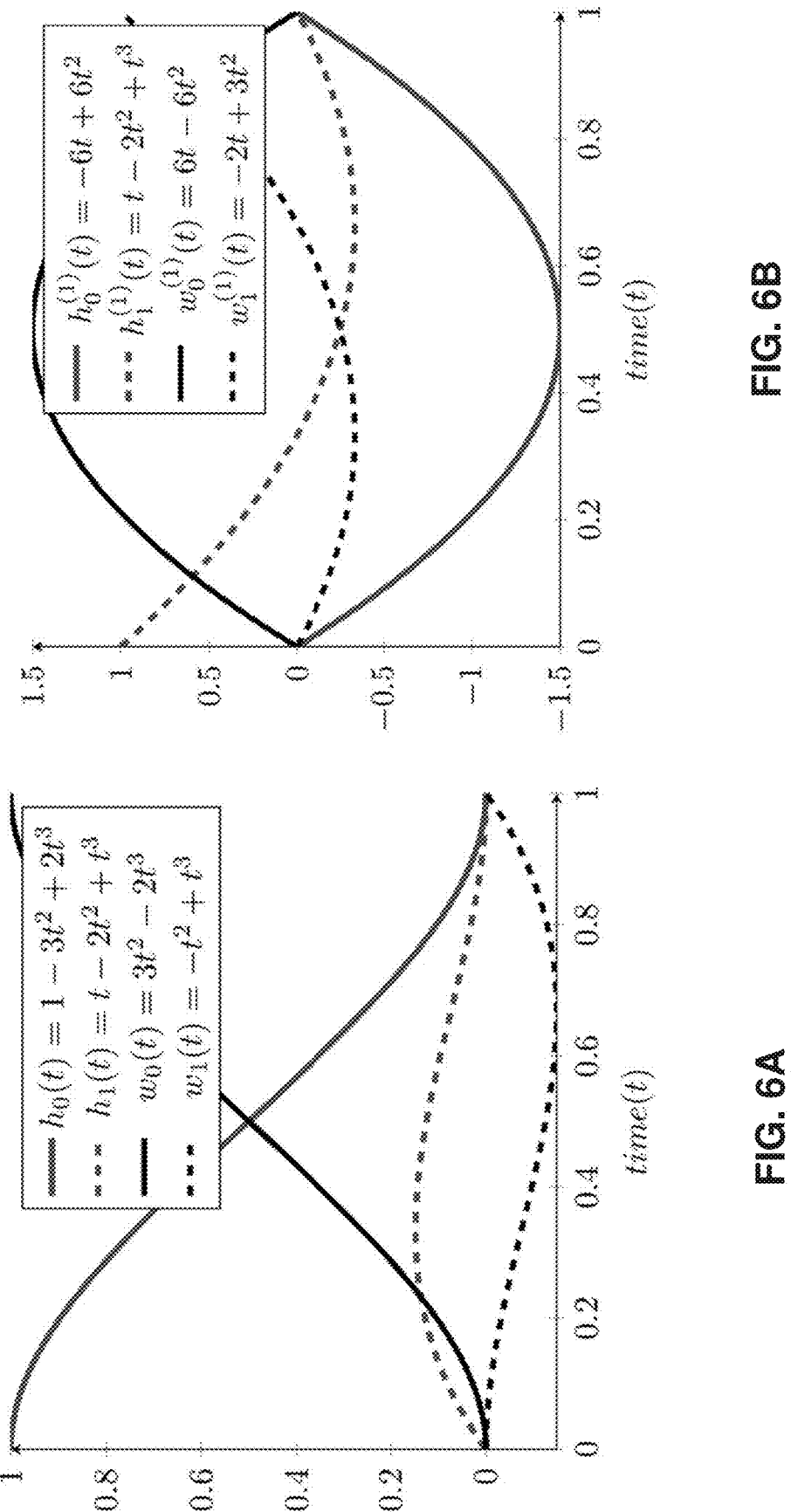
FIGS. 6A-6B illustrate exemplary basis functions in accordance with the disclosure.

FIGS. 6A-6B show plots of example basis functions $$\{h_j, w_j\}_{j=0}^{n-1} \text{ for } n = 2.$$

The basis functions shown include:

$$h_0(t) = 1 - 3t^2 + 2t^3 \tag{2}$$

$$h_1(t) = t - 2t^2 + t^3$$

$$w_0(t) = 3t^2 - 2t^3$$

$$w_1(t) = -t^2 + t^3$$

Figures 7A, 7B:
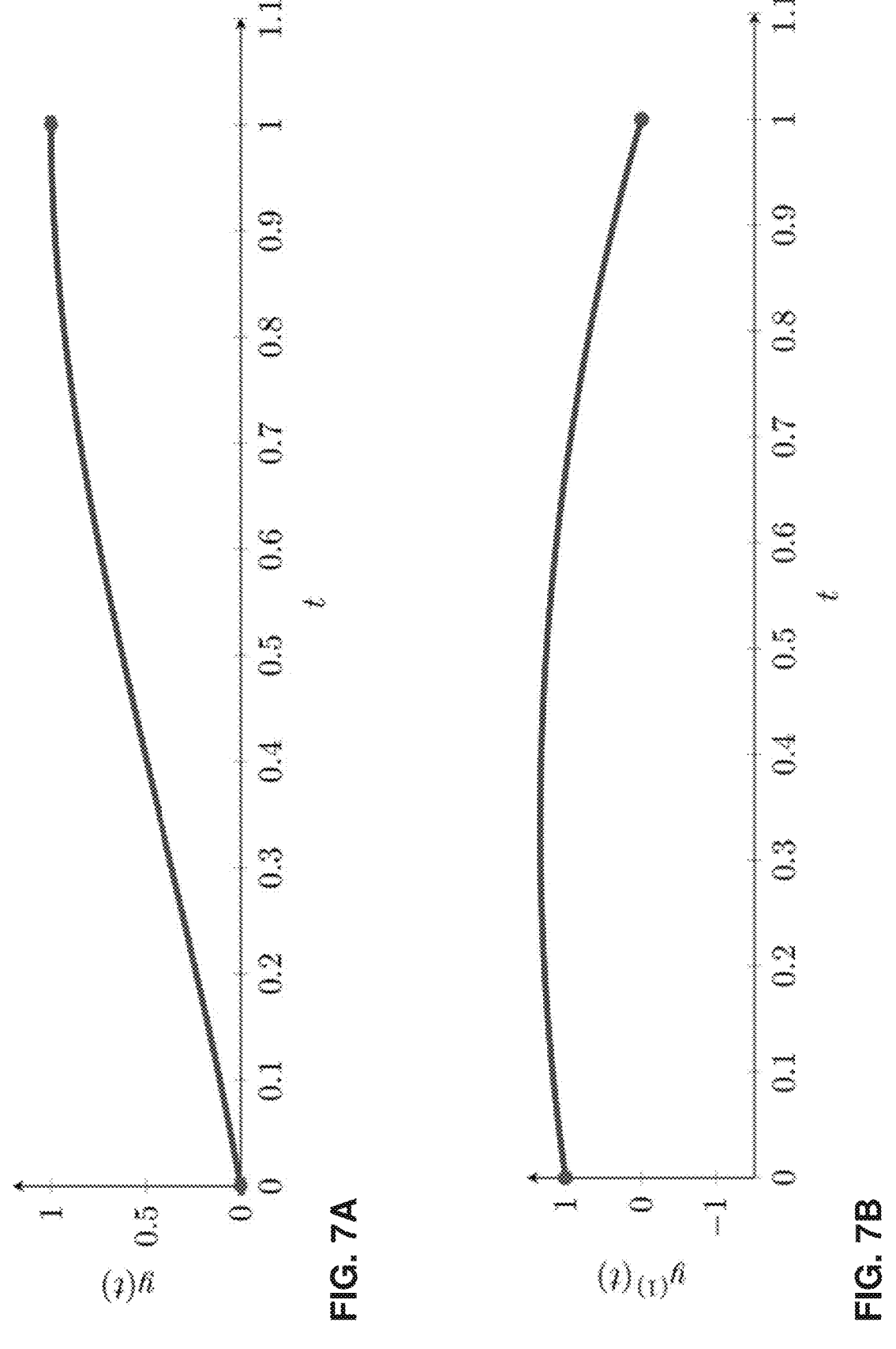
FIG. 7A illustrates an exemplary trajectory in accordance with the disclosure.
FIG. 7B illustrates an exemplary derivative of a trajectory in accordance with the disclosure.

The basis function optimizer 422 according to the disclosure is described in more detail below. The basis function optimizer 422 may include a predefined time generator that is configured to optimize the basis function(s). The predefined time generator may be According to the disclosure, the trajectory generator 420 may be configure to generate a trajectory connecting two states based on the basis function equations (2) discussed above. With reference to FIG. 7A, Given $x_k=[x_{k,0}, \ldots, x_{k,n-1}]^T$ and $x_k=[x_{k+1,0}, \ldots, x_{k+1,n-1}]^T$, the trajectory generator 420 may be configured to generate a trajectory for the interval t E $[t_k, t_{k+1}]$ that satisfies the Equation 3.1:

$$y_j(t) = \sum_{j=0}^{n-1}\left(\delta_k^j w_j\left(\frac{t - t_k}{\delta_k}\right)x_{k+1,j} + \delta_k^j h_j\left(\frac{t - t_k}{\delta_k}\right)x_{k,j}\right) \tag{3.1}$$

Where $\delta_k = t_{k+1} - t_k$, satisfies $y^{(i)}(t_k) = x_{k,i}$ and $y^{(i)}(t_{k+1}) = x_{k+1,i}$, for all $i = 0, \ldots, n - 1$.

The i-th derivative of y (t), is given by Equation 3.2 and illustrated in FIG. 7B:

$$y_j^{(i)}(t) = \sum_{j=0}^{n-1}\left(\delta_k^{j-i} w_j^{(i)}\left(\frac{t - t_k}{\delta_k}\right)x_{k+1,j} + \delta_k^{j-i} h_j^{(i)}\left(\frac{t - t_k}{\delta_k}\right)x_{k,j}\right) \tag{3.2}$$

The predefined time generator of the basis function optimizer 422 may be configured to determine a fixed-time and end-point control, an optimal energy trajectory, and the optimal basis function(s).

Fixed-Time and End-Point Control

The basis function optimizer 422 may be configured to obtain basis functions $$\{h_j, w_j\}_{j=0}^{n+1}$$

such that the trajectory y(t) in (3.1) minimize a desired objective functional. The basis function optimizer 422 may use the model (e.g. a controllable time-varying system in controller canonical form) as provided in Equation (4) that describes the trajectory and its time derivatives that initiate at fixed initial states and a given energy cost criterion as provided in Equation (4). The basis function optimizer 422 may select a linear quadratic regulator (e.g. as provided in Equation 7) as the input to the model (e.g. of Equation 4) which minimizes the selected energy cost criterion of Equation (4).

According to the disclosure, the model may satisfy Equation (4):

$$\dot{x}(t) = A(t)x(t) + B(t)u(t), x(t_0) = x_0 \tag{4}$$

$$y(t) = x_0(t)$$

where $x(t)=(x_0(t) x_1(t) \ldots x_{n-1}(t))^T$ is the state of the system, $u(t)=(u_0(t) u_1(t) \ldots u_{m-1}(t))^T$ is the input to the system, matrices A(t), B(t) are continuous in t such that $$A(t) = \begin{bmatrix} 0 & 1 & 0 & \ldots & 0 \\ 0 & 0 & 1 & \ldots & 0 \\ \vdots & \vdots & \vdots & \ddots & \vdots \\ 0 & 0 & 0 & \ldots & 1 \\ -a_0(t) & -a_1(t) & -a_2(t) & \ldots & -a_{n-1}(t) \end{bmatrix} \text{ and } B(t) = \begin{bmatrix} 0 \\ 0 \\ \vdots \\ 0 \\ b_0(t) \end{bmatrix}$$

The objective functional that associates a cost value to each admissible control law is provided by Equation (5):

$$J(u(t)) = \int_{t_0}^{t_f} x^T(t)Q(t)x(t) + u^T(t)R(t)u(t)dt \tag{5}$$

where $Q(\cdot)$, $R(\cdot)$ are matrices of appropriate dimensions satisfying $Q(t)=Q^T(t)\geq 0$ and $R(t)=R^T(t)>0$, for all $t\in[t_0\ t_1]$. The selection of matrices Q(t) and R(t) gives different solutions for control as it penalizes the state and control input of the system.

According to the disclosure, the basis function optimizer 422 may be configured to determine, given any pairs of initial and final times and states of system/model (Equation 4), respectively, $(t_0, x_0)$ and $(t_f, x_f)$, a control function u(t) configured to cause that the state of the system to be transferred from $x_0$ at $t=t_0$ to $x_f$ at $t=t_f$ such that the functional J(u(t)) is minimized.

Minimum Energy Control

The solution of a Linear Quadratic Regulator (LQR) can be provided in terms of the minimum energy control problem of an auxiliary system (e.g. Q(t)=0 and R(t)=I). The minimizer of the objective functional:

$$J(u(t)) = \int_{t_0}^{t_f} \|u(t)\|^2 dt,$$

is given by the control input:

$$u(t) = -B^T(t)\Phi^T(t_0, t)W^{-1}(t_0, t_f)(x_0 - \Phi(t_0, t_f)x_f)$$

where $W(t_0, t)$ defined as $$W(t_0, t) = \int_{t_0}^{t_f} \Phi(t_0, t)B(t)B^T(t)\Phi^T(t_0, t)dt$$

and $\Phi(t_0, t)$ given by the Peano-Baker series:

$$\Phi(t_0, t) = I + \int_{\tau}^{t} A(\sigma_1)d\sigma_1 + \int_{\tau}^{t} A(\sigma_1)\int_{\tau}^{\sigma_1} A(\sigma_2)d\sigma_2 d\sigma_1 + \int_{\tau}^{t} A(\sigma_1)\int_{\tau}^{\sigma_1} A(\sigma_2)\int_{\tau}^{\sigma_2} A(\sigma_3)d\sigma_3 d\sigma_2 d\sigma_1 + \dots$$

may correspond to the controllability Gramian and state transition matrix (or free motion) of the model/system of Equation (4), respectively.

According to the disclosure, the basis function optimizer 422 may ensure that the minimum energy required to drive the state from $x_0$ to $x_f$ is given by:

$$\int_{t_0}^{t_f} \|u(t)\|^2 dt = \|x_0 - \Phi(t_0, t_f)x_f\|^2_{W^{-1}(t_0, t_f)}$$

which equals to zero when the free motion initiating at $x_0$ intersects $x_f$.

Linear Quadratic Regulator

Considering model/system (4) and an auxiliary time-varying system:

$$\dot{x}(t) = \overline{A}(t)x(t) + B(t)v(t), x(t_0) = x_0$$

where $\overline{A}(t) = A(t) - B(t)B^T(t)\Pi(t, K_f, t_f)$, matrix $\Pi(t, K_f, t_f)$ is the solution of the Riccati equation (Equation (6)):

$$\dot{K}(t) = -A^T(t)K(t) - K(t)A(t) + K(t)B(t)R^{-1}(t)B^T(t)K(t) - Q(t), \quad (6)$$

$$K(t_f) = K_f$$

for a given boundary condition $$K_f = K_f^T$$

and the auxiliary minimum energy control for the auxiliary system:

$$v(t) = -B^T(t)\Phi_{aux}^T(t_0, t)W_{aux}^{-1}(t_0, t_f)(x_0 - \Phi_{aux}(t_0, t_f)x_f)$$

where $$\phi_{aux}^T(t_0, t)$$

and $W_{aux}(t_0, t_f)$ are the state transition matrix and controllability Grammian for the auxiliary system (6), the basis function optimizer 422 can be configured such that the LQR minimizing the criterion (5) satisfies Equation (7):

$$u(t) = v(t) + R^{-1}(t)B^T(t)\prod(t_0, K_f, t_f)(x_0 - \Phi(t_0, t_f)x_f) \quad (7)$$

According to the disclosure, the resulting LQR ensures that the minimum value of the cost functional is given by Equation (8):

$$J(u(t)) = \int_{t_0}^{t_f} v^T(t)v(t)dt + x_0^T \prod(t_0, K_f, t_f)x_0 - x_f^T K_f x_f \quad (8)$$

$$= \|x_0 - \Phi_{aux}(t_0, t_f)x_f\|^2_{W_{aux}^{-1}(t_0, t_f)} + x_0^T \prod(t_0, K_f, t_f)x_0 - x_f^T K_f x_f$$

along any trajectory meeting the boundary condition. Considering the LQR and the closed-loop system, the basis function optimizer 422 is configured to determine the complete solution derived from the controller minimizing the quadratic objective functional (5). This solution is obtained as follows.

According to the disclosure, to determine the complete solution, the basis function optimizer 422 is configured to determine the optimal energy trajectory and optimal basis functions.

Optimal Energy Trajectory

The basis function optimizer 422 may be configured to use the resulting solution of the model provided in Equation (4) with input provided by Equation (7), which is the minimum energy trajectory along with its time derivatives in Equation (9). This resulting trajectory ends at a selected final state within a fixed time.

For the initial and final values $x_0$, $x_f$ and $K_f$, the function $\xi(x_0, x_f, K_f, t)$ denotes the solution of the closed-loop system provided by Equations (4)-(7) in the interval $[t_0, t_f]$. That is, $\xi(x_0, x_f, K_f, t)$ satisfying:

$$\dot{x}(t) = A(t)x(t) + B(t)(v(t) + R^{-1}(t)B^T(t)\prod(t_0, K_f, t_f)(x_0 - \Phi(t_0, t_f)x_f))$$

$$x(t_0) = x_0$$

$$v(t) = -B^T(t)\Phi_{aux}^T(t_0, t)W_{aux}^{-1}(t_0, t_f)(x_0 - \Phi_{aux}(t_0, t_f)x_f)$$

The complete closed-loop system's solution takes the form of the variation of constants formula as provided by Equation (9) as provided below:

$$\xi(x_0, x_f, K_f, t) = \Phi(t, t_0)x_0 + \quad (9)$$

$$\int_{t_0}^{t_f} \Phi(t, \sigma)B(\sigma)[v(\sigma) + R^{-1}(\sigma)B^T(\sigma)\prod(t_0, K_f, t_f)(x_0 - \Phi(t_0, t_f)x_f)]d\sigma$$

Since the control law u(t) is given in terms of the closed-loop solution, the function $\xi(x_0, x_f, K_f, t)$ minimizes the quadratic cost functional as provided in Equations (5) and (7).

Basis Functions

According to the disclosure, the basis function optimizer 422 may be configured to retrieve the optimal basis functions (e.g. from the expression in Equation (9)) by eliminating the terms of the initial or final states. For minimum energy cost function and a time-invariant integrator's chain, the resulting basis functions are polynomials. This is discussed in further detail below.

Let $$\{e\}_{j=0}^{n-1}$$

be the canonical basis of $R^n$, taking into account the expression in Equation (9), the choice of the pair the $(x_0, x_f)$ provides the j-th basis function and its time derivatives, namely for $(x_0, x_f)=(e_j, 0)$ and $(x_0, x_f)=(0, e_j)$, the n-dimensional vectors are respectively defined as:

$$\begin{pmatrix} h_j(t) \\ h_j^{(1)}(t) \\ \vdots \\ h_j^{(n-1)}(t) \end{pmatrix} = \xi(e_j, 0, K_f, t) \text{ and } \begin{pmatrix} w_j(t) \\ w_j^{(1)}(t) \\ \vdots \\ w_j^{(n-1)}(t) \end{pmatrix} = \xi(0, e_i, K_f, t),$$

For any $x_0$ and $x_f$ and considering that $y(t)=x_0(t)$, the basis function optimizer 422 is configured to arrive at the following representation $y(t)=\xi(x_0, x_f, K_f, t)$ of the predefined-time generator and its time derivatives, which provides the following representation:

$$\begin{pmatrix} y(t) \\ y^{(1)}(t) \\ \vdots \\ y^{(n-1)}(t) \end{pmatrix} = \begin{pmatrix} h_0(t) & \dots & h_{n-1}(t) \\ h_0^{(1)}(t) & \dots & h_{n-1}^{(1)}(t) \\ \vdots & & \vdots \\ h_0^{(n-1)}(t) & \dots & h_{n-1}^{(n-1)}(t) \end{pmatrix} x_0 + \begin{pmatrix} w_0(t) & \dots & w_{n-1}(t) \\ w_0^{(1)}(t) & \dots & w_{n-1}^{(1)}(t) \\ \vdots & & \vdots \\ w_0^{(n-1)}(t) & \dots & w_{n-1}^{(n-1)}(t) \end{pmatrix} x_f$$

In this configuration the model/system provided in Equation (4) is in canonical form. The predefined-time generator y(t) is associated to the trajectory minimizing the quadratic cost criteria with a value given by Equation (8) along the closed-loop system's solution.

Example Predefined Time Generators

The predefined time generators may include the minimization of the control energy, the minimum energy of an integrator's chain, and/or minimum energy control. The minimum energy control may include minimum velocity trajectory, minimum acceleration trajectory, and/or minimum jerk trajectory.

According to the disclosure, for minimizing the control energy, a first order system with linear dynamic given by $\dot{y}=-y+u$. Therefore, the basis functions given in Equation (1) minimize the control energy:

$$\int_{t_0}^{t_f} u(t)^2 dt$$

For minimum energy for an integrator's chain, the system as an integrator's chain:

$$\dot{x}_j = x_{j+1}, \text{ for } j = 0, \dots, n-1$$

$$\dot{x}_n = u$$

$$y = x_0$$

and the objective function as min $$\int_{t_0}^{t_f} \left(y^{(n+1)}(t)\right)^2 dt,$$

subject to: $y^{(i)}(0)=x_i(0)$ and $y^{(i)}(t_f)=x_i(t_f)$, for all $i=0, \dots, n-1$, the basis become $(2n+1)$-th order polynomials.

Regarding minimum energy control, as can be appreciated, $y^{(1)}(t)$ is the velocity of the trajectory; $y^{(2)}(t)$ is the acceleration of the trajectory; and $y^{(3)}(t)$ is the jerk of the trajectory. For the purpose of discussion, these trajectories minimize velocity, acceleration, and jerk.

For the minimum velocity trajectory, the trajectory $$y(t) = \frac{t}{t_f} x_0(t_f) + \left(1 - \frac{t}{t_f}\right) x_0(0)$$

corresponds to the trajectory that minimizes $$\int_{t_0}^{t_f} \left(y^{(1)}(t)\right)^2 dt$$

among all trajectories satisfying:

$$y(t_0) = x_0(t_0) \text{ and } y(t_f) = x_0(t_f).$$

For the minimum acceleration trajectory, the basis functions given in Equation (2) the basis functions that minimizes $$\int_{t_0}^{t_f} \left(y^{(2)}(t)\right)^2 dt \text{ i.e.,}$$

the trajectory:

$$y(t) = t_f \left(-\left(\frac{t}{t_f}\right)^2 + \left(\frac{t}{t_f}\right)^3\right) x_1(t_f) + \left(3\left(\frac{t}{t_f}\right)^2 - 2\left(\frac{t}{t_f}\right)^3\right) x_0(t_f) +$$

$$\left(1 - 3\left(\frac{t}{t_f}\right)^2 + 2\left(\frac{t}{t_f}\right)^3\right) x_0(0) + t_f\left(\left(\frac{t}{t_f}\right) - 2\left(\frac{t}{t_f}\right)^2 + \left(\frac{t}{t_f}\right)^3\right) x_1(0)$$

is the trajectory that minimizes $$\int_{t_0}^{t_f} \left(y^{(2)}(t)\right)^2 dt$$

among all trajectories satisfying:

$$y(0) = x_0(0), \; y(t_f) = x_0(t_f), \; y^{(1)}(0) = x_1(0)$$

and $$y^{(1)}(t_f) = x_1(t_f).$$

For the minimum jerk trajectory, the basis functions to minimize $$\int_{t_0}^{t_f} \left( y^{(3)}(t) \right)^2 dt$$

are:

$$h_0(t) = 1 - 10t^3 + 15t^4 - 6t^5$$
$$h_1(t) = t - 6t^3 + 8t^4 - 3t^5$$
$$h_2(t) = 0.5t^2 - 1.5t^3 + 1.5t^4 - 0.5t^5$$
$$w_0(t) = 10t^3 - 15t^4 + 6t^5$$
$$w_1(t) = -4t^3 + 7t^4 - 3t^5$$
$$w_2(t) = 0.5t^3 - t^4 + 0.5t^5$$

Time Optimization

According to the disclosure, the time optimizer 424 of the trajectory generator 420 may be configured to determine the final time provided in the generated trajectory y(t) of the trajectory generator 420. The final time may be determined based on one or more constraints of the cobot 102, such as the maximum velocity, acceleration, toque, etc. of the cobot 102. The constraints may be defined for each joint of the manipulator of the cobot 102. The constraints may be provided in the generator configuration 426.

According to the disclosure, the time optimizer 424 may be configured to, based on an initial and a final state, determine a minimal time in which the generated trajectory satisfies a set of constraints on its derivative, for all joints of the robot. According to the disclosure, the minimal time is determined by solving the following optimization problem:

Minimize: $t_f$
subject to:
for every joint $q \in [1, m]$
for all $t \in [0, t_f]$
for every derivative $i \in [0, k]$ $$-y_{i,q,m} \le \sum_{j=0}^{n-1} \left( t_f^{j-i} w_{q,j}^{(i)} \left( \frac{t}{t_f} \right) x_{q,j}(t_f) + t_f^{j-i} h_{q,j}^{(i)} \left( \frac{t}{t_f} \right) x_{q,j}(0) \right) \le y_{i,q,m}$$

where $y_{i,q,m}$ are desired constraints for the i-th derivative of the q-th joint.

Such problem can be solved analytically for the minimum acceleration case and iteratively in the arbitrary order case. The time optimizer 424 may be configured to solve the problem using one or more sampling methods, such as Monte Carlo sampling methods, particle swarm optimization, and/or one or more other sampling methods as would be understood by one of ordinary skill in the arts.

EXAMPLES

The following examples pertain to various techniques of the present disclosure.

An example (e.g. example 1) relates to a controller for a robot, comprising: a path planner configured to determine a plurality of waypoints defining a path between an initial pose of the robot and a goal pose of the robot; a trajectory generator configured to determine a trajectory between the initial pose and the goal pose based on the waypoints and one or more trajectory criterion; and a trajectory controller configured to generate a control signal to control the robot based on the trajectory.

Another example (e.g. example 2) relates to a previously-described example (e.g. example 1), wherein the one or more trajectory criterion comprises an energy cost criterion, wherein the trajectory generator is configured to determine the trajectory to minimize the energy cost criterion.

Another example (e.g. example 3) relates to a previously-described example (e.g. one or more of examples 1-2), wherein the waypoints are determined based on one or more demonstrated end-effector trajectories of an end-effector of a manipulator arm of the robot.

Another example (e.g. example 4) relates to a previously-described example (e.g. one or more of examples 1-3), wherein the trajectory between the initial pose and the goal pose is determined per joint of a manipulator arm of the robot.

Another example (e.g. example 5) relates to a previously-described example (e.g. one or more of examples 1-4), wherein the path planner is configured to determine the waypoints based on a current state of the robot, a goal of the robot, and/or one or more detected obstacles.

Another example (e.g. example 6) relates to a previously-described example (e.g. one or more of examples 1-5), wherein the path planner is configured to determine a motion primitive between each pair of consecutive waypoints of the plurality of waypoints based on the one or more trajectory criterion.

Another example (e.g. example 7) relates to a previously-described example (e.g. example 6), wherein the motion primitive is a polynomial that connects each pair of the consecutive waypoints.

Another example (e.g. example 8) relates to a previously-described example (e.g. one or more of examples 1-7), wherein the trajectory generator is configured to determine a basis function that minimizes the one or more trajectory criterion to determine the trajectory between the initial pose and the goal pose.

Another example (e.g. example 8) relates to a previously-described example (e.g. example 8), wherein the trajectory generator is further configured to determine a minimum trajectory time based on the initial pose of the robot, the goal pose of the robot, and one or more trajectory criterion, wherein the trajectory is determined based on the basis function and the minimum trajectory time.

Another example (e.g. example 10) relates a collaborative robot, comprising: a manipulator arm configured to move from an initial pose to a goal pose; and a controller configured to: determine a plurality of waypoints defining a path between the initial pose and the goal pose; determine a trajectory between the initial pose and the goal pose based on the waypoints and one or more trajectory criterion; and generate a control signal to control the manipulator arm based on the trajectory.

Another example (e.g. example 11) relates to a previously-described example (e.g. example 10), wherein the one or more trajectory criterion comprises an energy cost criterion, wherein the controller is configured to determine the trajectory to minimize the energy cost criterion.

Another example (e.g. example 12) relates to a previously-described example (e.g. one or more of examples 10-11), wherein the waypoints are determined based on one or more demonstrated end-effector trajectories of an end-effector of the manipulator arm.

Another example (e.g. example 13) relates to a previously-described example (e.g. one or more of examples 10-12), wherein the trajectory between the initial pose and the goal pose is determined per joint of the manipulator arm.

Another example (e.g. example 14) relates to a previously-described example (e.g. one or more of examples 10-13), wherein the controller is configured to determine the waypoints based on a current state of the collaborative robot, a goal of the collaborative robot, and/or one or more detected obstacles.

Another example (e.g. example 15) relates to a previously-described example (e.g. one or more of examples 10-14), wherein the controller is configured to determine a motion primitive between each pair of consecutive waypoints of the plurality of waypoints based on the one or more trajectory criterion.

Another example (e.g. example 16) relates to a previously-described example (e.g. example 15), wherein the motion primitive is a polynomial that connects each pair of the consecutive waypoints.

Another example (e.g. example 17) relates to a previously-described example (e.g. one or more of examples 10-16), wherein the controller is configured to determine a basis function that minimizes the one or more trajectory criterion to determine the trajectory between the initial pose and the goal pose.

Another example (e.g. example 18) relates to a previously-described example (e.g. example 17), wherein the controller is further configured to determine a minimum trajectory time based on the initial pose, the goal pose, and one or more trajectory criterion, wherein the trajectory is determined based on the basis function and the minimum trajectory time.

Another example (e.g. example 19) relates to a non-transitory computer-readable storage medium with an executable program stored thereon, that when executed, instructs a processor to perform a motion planning method, for an autonomous agent, comprising: determining a plurality of waypoints defining a path between an initial pose of a manipulator arm of the autonomous agent and a goal pose of the manipulator arm; determining a trajectory between the initial pose and the goal pose based on the waypoints and one or more trajectory criterion; and generating a control signal to control the manipulator arm based on the trajectory.

Another example (e.g. example 20) relates to a previously-described example (e.g. example 19), wherein the one or more trajectory criterion comprises an energy cost criterion, wherein determining the trajectory minimizes the energy cost criterion.

Another example (e.g. example 21) relates to a previously-described example (e.g. one or more of examples 19-20), wherein the waypoints are determined based on one or more demonstrated end-effector trajectories of an end-effector of the manipulator arm.

Another example (e.g. example 22) relates to a previously-described example (e.g. one or more of examples 19-21), wherein the trajectory between the initial pose and the goal pose is determined per joint of the manipulator arm.

Another example (e.g. example 23) relates to a previously-described example (e.g. one or more of examples 19-22), further comprising determining a motion primitive between each pair of consecutive waypoints of the plurality of waypoints based on the one or more trajectory criterion.

Another example (e.g. example 24) relates to a previously-described example (e.g. one or more of examples 19-20), wherein the motion primitive is a polynomial that connects each pair of the consecutive waypoints.

Another example (e.g. example 25) relates to a previously-described example (e.g. one or more of examples 19-20), further comprising: determining a basis function that minimizes the one or more trajectory criterion to determine the trajectory between the initial pose and the goal pose; and determining a minimum trajectory time based on the initial pose, the goal pose, and one or more trajectory criterion, wherein the trajectory is determined based on the basis function and the minimum trajectory time.

Another example (e.g. example 26) relates to a controller for a robot, comprising: path planning means for determining a plurality of waypoints defining a path between an initial pose of the robot and a goal pose of the robot; trajectory generating means for determining a trajectory between the initial pose and the goal pose based on the waypoints and one or more trajectory criterion; and trajectory controlling means for generating a control signal to control the robot based on the trajectory.

Another example (e.g. example 27) relates to a previously-described example (e.g. example 26), wherein the one or more trajectory criterion comprises an energy cost criterion, wherein the trajectory generator is configured to determine the trajectory to minimize the energy cost criterion.

Another example (e.g. example 28) relates to a previously-described example (e.g. one or more of examples 26-27), wherein the waypoints are determined based on one or more demonstrated end-effector trajectories of an end-effector of a manipulator arm of the robot.

Another example (e.g. example 29) relates to a previously-described example (e.g. one or more of examples 26-28), wherein the trajectory between the initial pose and the goal pose is determined per joint of a manipulator arm of the robot.

Another example (e.g. example 30) relates to a previously-described example (e.g. one or more of examples 26-29), wherein the path planning means is configured to determine the waypoints based on a current state of the robot, a goal of the robot, and/or one or more detected obstacles.

Another example (e.g. example 31) relates to a previously-described example (e.g. one or more of examples 26-30), wherein the path planning means is configured to determine a motion primitive between each pair of consecutive waypoints of the plurality of waypoints based on the one or more trajectory criterion.

Another example (e.g. example 32) relates to a previously-described example (e.g. example 31), wherein the motion primitive is a polynomial that connects each pair of the consecutive waypoints.

Another example (e.g. example 33) relates to a previously-described example (e.g. one or more of examples 26-32), wherein the trajectory generating means is configured to determine a basis function that minimizes the one or more trajectory criterion to determine the trajectory between the initial pose and the goal pose.

Another example (e.g. example 34) relates to a previously-described example (e.g. example 33), wherein the trajectory generating means is further configured to determine a minimum trajectory time based on the initial pose of the robot, the goal pose of the robot, and one or more trajectory criterion, wherein the trajectory is determined based on the basis function and the minimum trajectory time.

Another example (e.g. example 35) relates to a collaborative robot, comprising: manipulating means movable from an initial pose to a goal pose; and controlling means for: determining a plurality of waypoints defining a path between the initial pose and the goal pose; determining a trajectory between the initial pose and the goal pose based on the waypoints and one or more trajectory criterion; and generating a control signal to control the manipulating means based on the trajectory.

Another example (e.g. example 36) relates to a previously-described example (e.g. example 35), wherein the one or more trajectory criterion comprises an energy cost criterion, wherein the controlling means is configured to determine the trajectory to minimize the energy cost criterion.

Another example (e.g. example 37) relates to a previously-described example (e.g. one or more of examples 35-36), wherein the waypoints are determined based on one or more demonstrated end-effector trajectories of an end-effector of the manipulating means.

Another example (e.g. example 38) relates to a previously-described example (e.g. one or more of examples 35-37), wherein the trajectory between the initial pose and the goal pose is determined per joint of the manipulating means.

Another example (e.g. example 39) relates to a previously-described example (e.g. one or more of examples 35-38), wherein the controlling means is configured to determine the waypoints based on a current state of the collaborative robot, a goal of the collaborative robot, and/or one or more detected obstacles.

Another example (e.g. example 40) relates to a previously-described example (e.g. one or more of examples 35-39), wherein the controlling means is configured to determine a motion primitive between each pair of consecutive waypoints of the plurality of waypoints based on the one or more trajectory criterion.

Another example (e.g. example 41) relates to a previously-described example (e.g. example 40), wherein the motion primitive is a polynomial that connects each pair of the consecutive waypoints.

Another example (e.g. example 42) relates to a previously-described example (e.g. one or more of examples 35-41), wherein the controlling means is configured to determine a basis function that minimizes the one or more trajectory criterion to determine the trajectory between the initial pose and the goal pose.

Another example (e.g. example 43) relates to a previously-described example (e.g. example 42), wherein the controlling means is further configured to determine a minimum trajectory time based on the initial pose, the goal pose, and one or more trajectory criterion, wherein the trajectory is determined based on the basis function and the minimum trajectory time.

Another example (e.g. example 44) relates to a motion planning method, comprising: determining a plurality of waypoints defining a path between an initial pose of a manipulator arm of an autonomous agent and a goal pose of the manipulator arm; determining a trajectory between the initial pose and the goal pose based on the waypoints and one or more trajectory criterion; and generating a control signal to control the manipulator arm based on the trajectory.

Another example (e.g. example 45) relates to a previously-described example (e.g. example 44), wherein the one or more trajectory criterion comprises an energy cost criterion, wherein determining the trajectory minimizes the energy cost criterion.

Another example (e.g. example 46) relates to a previously-described example (e.g. one or more of examples 44-45), wherein the waypoints are determined based on one or more demonstrated end-effector trajectories of an end-effector of the manipulator arm.

Another example (e.g. example 47) relates to a previously-described example (e.g. one or more of examples 44-46), wherein the trajectory between the initial pose and the goal pose is determined per joint of the manipulator arm.

Another example (e.g. example 48) relates to a previously-described example (e.g. one or more of examples 44-47), further comprising determining a motion primitive between each pair of consecutive waypoints of the plurality of waypoints based on the one or more trajectory criterion.

Another example (e.g. example 49) relates to a previously-described example (e.g. example 48), wherein the motion primitive is a polynomial that connects each pair of the consecutive waypoints.

Another example (e.g. example 50) relates to a previously-described example (e.g. one or more of examples 44-49), further comprising: determining a basis function that minimizes the one or more trajectory criterion to determine the trajectory between the initial pose and the goal pose; and determining a minimum trajectory time based on the initial pose, the goal pose, and one or more trajectory criterion, wherein the trajectory is determined based on the basis function and the minimum trajectory time.

Another example (e.g. example 51) relates to an autonomous agent comprising the controller of a previously-described example (e.g. one or more of examples 1-9 and 26-34).

Another example (e.g. example 52) relates to non-transitory computer-readable storage medium with an executable program stored thereon, that when executed, instructs a processor to perform a method as shown and described.

Another example (e.g. example 53) relates to an autonomous agent as shown and described.

Another example (e.g. example 54) relates to an apparatus as shown and described.

Another example (e.g. example 55) relates a method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor," "processing circuitry," or "controller" as used herein may be understood as any kind of technological entity that allows handling of data. The data may be handled according to one or more specific functions executed by the processor, processing circuitry, or controller. Further, processing circuitry, a processor, or a controller as used herein may be understood as any kind of circuit, e.g., any kind of analog or digital circuit. Processing circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as processing circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processing circuitry detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). Processing circuitry, a processor, or a controller may transmit or receive data over a software-level connection with another processor, controller, or processing circuitry in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An "agent" may be understood to include any type of driven object. An agent may be a driven object with a combustion engine, a reaction engine, an electrically driven object, a hybrid driven object, or a combination thereof. An agent may be or may include a moving robot, a personal transporter, a drone, and the like.

The term "autonomous agent" may describe an agent that implements all or substantially all navigational changes, at least during some (significant) part (spatial or temporal, e.g., in certain areas, or when ambient conditions are fair, or on highways, or above or below a certain speed) of some drives. Sometimes an "autonomous agent" is distinguished from a "partially autonomous agent" or a "semi-autonomous agent" to indicate that the agent is capable of implementing some (but not all) navigational changes, possibly at certain times, under certain conditions, or in certain areas. A navigational change may describe or include a change in one or more of steering, braking, or acceleration/deceleration of the agent. An agent may be described as autonomous even in case the agent is not fully automatic (fully operational with driver or without driver input). Autonomous agents may include those agents that can operate under driver control during certain time periods and without driver control during other time periods. Autonomous agents may also include agents that control only some implementations of agent navigation, such as steering (e.g., to maintain an agent course between agent lane constraints) or some steering operations under certain circumstances (but not under all circumstances), but may leave other implementations of agent navigation to the driver (e.g., braking or braking under certain circumstances). Autonomous agents may also include agents that share the control of one or more implementations of agent navigation under certain circumstances (e.g., hands-on, such as responsive to a driver input) and agents that control one or more implementations of agent navigation under certain circumstances (e.g., hands-off, such as independent of driver input). Autonomous agents may also include agents that control one or more implementations of agent navigation under certain circumstances, such as under certain environmental conditions (e.g., spatial areas, roadway conditions). In some implementations, autonomous agents may handle some or all implementations of braking, speed control, velocity control, and/or steering of the agent. An autonomous agent may include those agents that can operate without a driver. The level of autonomy of an agent may be described or determined by the Society of Automotive Engineers (SAE) level of the agent (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the agent (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. According to the disclosure, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing an agent to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. A controller for a robot, comprising:
   a path planner configured to determine a plurality of waypoints defining a path between an initial pose of the robot and a goal pose of the robot;
   a trajectory generator configured to determine a trajectory between the initial pose and the goal pose based on the waypoints and one or more trajectory criterion by (i) selecting, from among a plurality of independent predetermined basis functions, one or more basis functions corresponding to a dynamic constraint type of respective ones of the one or more trajectory criterion that are to be satisfied while traversing the trajectory between the initial pose and the goal pose, the respective ones of the one or more trajectory criterion that are to be satisfied comprising a minimization of velocity, acceleration, or jerk of the robot while traversing the trajectory, and (ii) forecasting, after the robot has moved from the initial pose, a future pose of the robot that satisfies the one or more trajectory criterion, and using the future pose as a starting pose of the robot for one of the plurality of waypoints along the trajectory; and
   a trajectory controller configured to generate a control signal to control the robot based on the trajectory.

2. The controller of claim 1, wherein the one or more trajectory criterion further comprise an energy cost criterion, and
   wherein the trajectory generator is configured to determine the trajectory to minimize the energy cost criterion.

3. The controller of claim 1, wherein the waypoints are determined based on one or more demonstrated end-effector trajectories of an end-effector of a manipulator arm of the robot.

4. The controller of claim 1, wherein the trajectory between the initial pose and the goal pose is determined per joint of a manipulator arm of the robot.

5. The controller of claim 1, wherein the path planner is configured to determine the waypoints based on a current state of the robot, a goal of the robot, and/or one or more detected obstacles.

6. The controller of claim 1, wherein the path planner is configured to determine a motion primitive between each pair of consecutive waypoints of the plurality of waypoints based on the one or more trajectory criterion.

7. The controller of claim 6, wherein the motion primitive is a polynomial that connects each pair of the consecutive waypoints.

8. The controller of claim 1, wherein the trajectory generator is further configured to determine, as the one or more trajectory criterion that are to be satisfied, a minimum trajectory time, and
   wherein the trajectory is determined based on the minimum trajectory time.

9. The controller of claim 1, wherein the trajectory generator is configured to determine, for each joint of the robot, a minimum trajectory time that, based on the initial pose and the goal pose of the robot, satisfies the one or more trajectory criterion.

10. The controller of claim 1, wherein the trajectory generator is configured to determine the trajectory during robot operation, to select the one or more basis functions dynamically during robot operation based on changing trajectory criterion during execution of the trajectory, and to determine the trajectory by calculating a minimized quadratic cost functional based on the selected one or more basis functions that satisfies the respective ones of the one or more trajectory criterion.

11. A collaborative robot, comprising:
    a manipulator arm configured to move from an initial pose to a goal pose; and
    a controller configured to:
       determine a plurality of waypoints defining a path between the initial pose and the goal pose;
       determine a trajectory between the initial pose and the goal pose based on the waypoints and one or more trajectory criterion by (i) selecting, from among a plurality of independent predetermined basis functions, one or more basis functions corresponding to a dynamic constraint type of respective ones of the one or more trajectory criterion that are to be satisfied while traversing the trajectory between the initial pose and the goal pose, the respective ones of the one or more trajectory criterion that are to be satisfied comprising a minimization of velocity, acceleration, or jerk of the robot while traversing the trajectory, and (ii) forecasting, after the robot has moved from the initial pose, a future pose of the robot that satisfies the one or more trajectory criterion, and using the future pose as a starting pose of the robot for one of the plurality of waypoints along the trajectory; and
       generate a control signal to control the manipulator arm based on the trajectory.

12. The collaborative robot of claim 11, wherein the one or more trajectory criterion further comprise an energy cost criterion, and
    wherein the controller is configured to determine the trajectory to minimize the energy cost criterion.

13. The collaborative robot of claim 11, wherein the controller is configured to determine the waypoints based on one or more demonstrated end-effector trajectories of an end-effector of the manipulator arm.

14. The collaborative robot of claim 11, wherein the controller is configured to determine the trajectory between the initial pose and the goal pose per joint of the manipulator arm.

15. The collaborative robot of claim 11, wherein the controller is configured to determine the waypoints based on a current state of the collaborative robot, a goal of the collaborative robot, and/or one or more detected obstacles.

16. The collaborative robot of claim 11, wherein the controller is configured to determine a motion primitive between each pair of consecutive waypoints of the plurality of waypoints based on the one or more trajectory criterion.

17. The collaborative robot of claim 16, wherein the motion primitive is a polynomial that connects each pair of the consecutive waypoints.

18. The collaborative robot of claim 11, wherein the controller is further configured to determine, as the one or more trajectory criterion that are to be satisfied, a minimum trajectory time, and wherein the trajectory is determined based on the minimum trajectory time.

19. A non-transitory computer-readable storage medium with an executable program stored thereon, that when executed, instructs a processor to perform a motion planning method, for an autonomous agent, comprising:

determining a plurality of waypoints defining a path between an initial pose of a manipulator arm of the autonomous agent and a goal pose of the manipulator arm;

determining a trajectory between the initial pose and the goal pose based on the waypoints and one or more trajectory criterion by (i) selecting, from among a plurality of independent predetermined basis functions, one or more basis functions corresponding to a dynamic constraint type of respective ones of the one or more trajectory criterion that are to be satisfied while traversing the trajectory between the initial pose and the goal pose, the respective ones of the one or more trajectory criterion that are to be satisfied comprising a minimization of velocity, acceleration, or jerk of the autonomous agent while traversing the trajectory, and (ii) forecasting, after the manipulator arm has moved from the initial pose, a future pose of the manipulator arm that satisfies the one or more trajectory criterion, and using the future pose as a starting pose of the manipulator arm for one of the plurality of waypoints along the trajectory; and generating a control signal to control the manipulator arm based on the trajectory.

20. The non-transitory computer-readable storage medium of claim 19, wherein the one or more trajectory criterion further comprises an energy cost criterion, and wherein determining the trajectory minimizes the energy cost criterion.

21. The non-transitory computer-readable storage medium of claim 19, wherein the waypoints are determined based on one or more demonstrated end-effector trajectories of an end-effector of the manipulator arm.

22. The non-transitory computer-readable storage medium of claim 19, wherein the trajectory between the initial pose and the goal pose is determined per joint of the manipulator arm.

23. The non-transitory computer-readable storage medium of claim 19, further comprising determining a motion primitive between each pair of consecutive waypoints of the plurality of waypoints based on the one or more trajectory criterion.

24. The non-transitory computer-readable storage medium of claim 23, wherein the motion primitive is a polynomial that connects each pair of the consecutive waypoints.

25. The non-transitory computer-readable storage medium of claim 19, further comprising:

determining, as the one or more trajectory criterion that are to be satisfied, a minimum trajectory time, and wherein the trajectory is determined based on the minimum trajectory time.

* * * * *